United States Patent
Nakayama et al.

(10) Patent No.: US 12,162,248 B2
(45) Date of Patent: Dec. 10, 2024

(54) LAMINATED GLASS AND VEHICLE SYSTEM

(71) Applicant: SEKISUI CHEMICAL CO., LTD., Osaka (JP)

(72) Inventors: Kazuhiko Nakayama, Kusatsu (JP); Atsushi Nohara, Kusatsu (JP); Daizou Ii, Moriyama (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 626 days.

(21) Appl. No.: 17/439,616

(22) PCT Filed: Mar. 30, 2020

(86) PCT No.: PCT/JP2020/014632
§ 371 (c)(1),
(2) Date: Sep. 15, 2021

(87) PCT Pub. No.: WO2020/203986
PCT Pub. Date: Oct. 8, 2020

(65) Prior Publication Data
US 2022/0152991 A1    May 19, 2022

(30) Foreign Application Priority Data

Mar. 29, 2019    (JP) .................... 2019-069117

(51) Int. Cl.
*B32B 17/10* (2006.01)
*G06V 20/59* (2022.01)
(Continued)

(52) U.S. Cl.
CPC .. *B32B 17/10633* (2013.01); *B32B 17/10036* (2013.01); *B32B 17/10449* (2013.01);
(Continued)

(58) Field of Classification Search
CPC ........ B32B 17/10633; B32B 17/10036; B32B 17/10449; B32B 17/10761;
(Continued)

(56) References Cited

U.S. PATENT DOCUMENTS 10,654,250 B2    5/2020    Ohmoto et al.
10,875,277 B2 *  12/2020   Aoki ................ B32B 27/08
(Continued)

FOREIGN PATENT DOCUMENTS

| CN | 104470869 | 3/2015 |
|---|---|---|
| CN | 105873877 | 8/2016 |

(Continued)

OTHER PUBLICATIONS

International Search Report issued Jun. 23, 2020 in International (PCT) Application No. PCT/JP2020/014632.

*Primary Examiner* — David P Porta
*Assistant Examiner* — Fani Polyzos Boosalis
(74) *Attorney, Agent, or Firm* — Wenderoth, Lind & Ponack, L.L.P.

(57) ABSTRACT

The laminated glass of the present invention has a T/R rate (A) of larger than 1, the T/R rate (A) being calculated from the following formula (1):

$$T/R\ rate\ (A) = \log 10(TA/100)/\log 10(RA/100) \quad (1)$$

wherein an average transmittance at a wavelength of 900 to 1300 nm through one face is represented by TA, and a maximum reflectance at a wavelength of 900 to 1300 nm at an incident angle of 60° on the other face is represented by RA.

12 Claims, 3 Drawing Sheets

(51) Int. Cl.
  *G06V 40/16*   (2022.01)
  *B60J 1/00*    (2006.01)
(52) U.S. Cl.
  CPC ...... *B32B 17/10761* (2013.01); *G06V 20/597* (2022.01); *G06V 40/166* (2022.01); *B32B 2605/003* (2013.01); *B60J 1/001* (2013.01)
(58) Field of Classification Search
  CPC ............ B32B 2605/003; G06V 20/597; G06V 40/166; B60J 1/001
  See application file for complete search history.

(56) References Cited

U.S. PATENT DOCUMENTS

| | | |
|---|---|---|
| 2008/0206533 A1 | 8/2008 | Yaoita et al. |
| 2015/0124068 A1 | 5/2015 | Madau et al. |
| 2015/0210043 A1 | 7/2015 | Ohmoto et al. |
| 2016/0085002 A1 | 3/2016 | Tanaka et al. |
| 2016/0332424 A1 | 11/2016 | Yamaguchi et al. |
| 2016/0332425 A1 | 11/2016 | Yamaguchi et al. |

FOREIGN PATENT DOCUMENTS

| | | |
|---|---|---|
| CN | 108483949 | 9/2018 |
| JP | 2006-096316 | 4/2006 |
| JP | 2010-098287 | 4/2010 |
| JP | 2014-177365 | 9/2014 |
| JP | 2014-200108 | 10/2014 |
| JP | 2014-231467 | 12/2014 |
| JP | 2015-097087 | 5/2015 |
| JP | 2015-115627 | 6/2015 |
| WO | 2007/020791 | 2/2007 |
| WO | 2011/007796 | 1/2011 |
| WO | 2015/115626 | 8/2015 |

* cited by examiner

LAMINATED GLASS AND VEHICLE SYSTEM

TECHNICAL FIELD

The present invention relates to a laminated glass and a vehicle system having a laminated glass.

BACKGROUND ART

As a window glass of an automobile, a laminated glass obtained by interposing an interlayer film between two glass plates and integrating them is widely used. The interlayer film is often formed from plasticized polyvinyl acetal obtained by compounding a plasticizer with a polyvinyl acetal resin. The laminated glass less suffers scattering of glass fragments even when it is subjected to external shock and is broken, and it has been enhanced in safety.

The laminated glass used for an automobile has been conventionally required to be improved in heat shielding property in order to prevent the temperature of the automobile interior from becoming too high because of outside light such as sunlight. On that account, it is known that in the interlayer film for the laminated glass, an organic dye, metal oxide particles, etc. which have high heat shielding effects are incorporated, or an infrared reflective layer is provided (see, for example, Patent Literatures 1 and 2). Moreover, it is also known that a functional plastic film consisting of an infrared reflective layer and an infrared absorbing layer is provided (see, for example, Patent Literature 3).

On the other hand, development of an automated operating system for automobiles has been advanced in recent years, and practical use of the system at so-called LEVEL 3 (conditional driving automation) has been promoted at present. In the automated operating system of LEVEL 3, even during operation of the system, a driver needs to operate when requested by the system in case of emergency or the like. On that account, it is important to monitor that the driver is on board in an operable state.

In the monitoring system, a technique to recognize a face of a driver by irradiating the driver's face with infrared radiation and capturing the reflected light by an infrared camera has been proposed. As the infrared radiation, the wavelength in the near infrared region that cannot be recognized with human eyes and is easily reflected by the human skin is used. Owing to this, whether the driver is seated, the direction of the driver's line of sight, whether the driver is dozing off, whether there is a sign thereof, etc. can be judged.

CITATION LIST

Patent Literature

PTL1: JP 2015/115627 A
PTL2: JP 2014/200108 A
PTL3: JP 2010/098287 A

SUMMARY OF INVENTION

Technical Problem

By the way, infrared radiation is contained also in outside light entering from the exterior of a vehicle, such as sunlight. On that account, when the monitoring system is applied and when the driver's face is irradiated with infrared radiation from the exterior of the vehicle, noise occurs, or halation due to excessive light intensity sometimes occurs, resulting in an obstacle to face recognition. The halation means that the light intensity is too strong and exceeds the detection sensitivity of the camera, so that the observation image becomes unclear.

As shown in Patent Literatures 1 to 3, when an organic dye or metal oxide particles are incorporated or an infrared reflective layer or an infrared absorbing layer is provided in the interlayer film, the infrared radiation is absorbed or reflected by the interlayer film, and irradiation of the driver's face with the infrared radiation from the vehicle exterior is prevented.

However, it is desirable to use, as the wavelength of the infrared light source (e.g., LED) used in the face recognition system, near infrared radiation having a wavelength of infrared reflection by the human skin to a wavelength of 900 to 1300 nm. A light of such wavelength cannot be sufficiently reflected or shielded by the conventional organic dye or metal oxide particles aiming at heat shielding, and there is a fear that the noise or the halation in the monitoring system cannot be sufficiently prevented.

Moreover, since the infrared light source for use in the face recognition system is installed on a dashboard, it has been studied that the infrared radiation is once reflected by a window glass such as a windshield and then applied to the human face. Likewise, it has been studied to also install an infrared camera for observing an object irradiated with the infrared radiation, on the dashboard. In order to observe the object by the infrared camera installed on the dashboard, it is desirable that the infrared radiation be reflected by a laminated glass and then made incident on the infrared camera. However, the conventional laminated glass has not been supposed to reflect infrared radiation on the vehicle interior side, so that there is a fear that the infrared radiation cannot be appropriately reflected, and the monitoring cannot be properly carried out.

Then, the present invention addresses the problem of providing a laminated glass by which monitoring can be properly carried out using infrared radiation even when an infrared monitoring system is introduced in various vehicles such as an automobile.

Solution to Problem

The present inventors have earnestly studied, and as a result, they have found that the above problem can be solved by keeping constant a relationship between an average transmittance through one face and a maximum reflectance at an incident angle of 60° on the other face in the prescribed infrared wavelength region, and they have completed the present invention below.

That is to say, the present invention provides the following [1] to [16].

[1] A laminated glass having a T/R rate (A) of larger than 1, the T/R rate (A) being calculated from the following formula (1):

$$T/R \text{ rate } (A) = \log 10(TA/100)/\log 10(RA/100) \quad (1)$$

wherein an average transmittance at a wavelength of 900 to 1300 nm through one face is represented by TA, and a maximum reflectance at a wavelength of 900 to 1300 nm at an incident angle of 60° on the other face is represented by RA.

[2] A laminated glass having a T/R rate (1) of larger than 1, the T/R rate (1) being calculated from the following formula (2-1):

$$T/R \text{ rate } (1) = \log 10(T1/100)/\log 10(R1/100) \quad (2-1)$$

wherein an average transmittance at a wavelength of 900 to 1000 nm through one face is represented by T1, and a maximum reflectance at a wavelength of 900 to 1000 nm at an incident angle of 60° on the other face is represented by R1.

[3] A laminated glass having a T/R rate (2) of larger than 1, the T/R rate (2) being calculated from the following (2-2):

$$T/R \text{ rate } (2) = \log 10(T2/100)/\log 10(R2/100) \qquad (2-2)$$

wherein an average transmittance at a wavelength of 1000 to 1100 nm through one face is represented by T2, and a maximum reflectance at a wavelength of 1000 to 1100 nm at an incident angle of 60° on the other face is represented by R2.

[4] A laminated glass having a T/R rate (3) of larger than 1, the T/R rate (3) being calculated from the following formula (2-3):

$$T/R \text{ rate } (3) = \log 10(T3/100)/\log 10(R3/100) \qquad (2-3)$$

wherein an average transmittance at a wavelength of 1100 to 1200 nm through one face is represented by T3, and a maximum reflectance at a wavelength of 1100 to 1200 nm at an incident angle of 60° on the other face is represented by R3.

[5] A laminated glass having a T/R rate (4) of larger than 1, the T/R rate (4) being calculated from the following formula (2-4):

$$T/R \text{ rate } (4) = \log 10(T4/100)/\log 10(R4/100) \qquad (2-4)$$

wherein an average transmittance at a wavelength of 1200 to 1300 nm through one face is represented by T4, and a maximum reflectance at a wavelength of 1200 to 1300 nm at an incident angle of 60° on the other face is represented by RA.

[6] A laminated glass used in an infrared monitoring system, having a T/R rate (B) of larger than 1, the T/R rate (B) being calculated from the following formula (3):

$$T/R \text{ rate } (B) = \log 10(TB/100)/\log 10(RB/100) \qquad (3)$$

wherein an average transmittance through one face at ±50 nm of a maximum emission wavelength of an infrared light source used in the infrared monitoring is represented by TB, and a maximum reflectance at ±50 nm of the maximum emission wavelength at an incident angle of 60° on the other face is represented by RB.

[7] The laminated glass according to any one of the above [1] to [6], comprising an infrared reflective layer.

[8] The laminated glass according to any one of the above [1] to [7], wherein the glass comprises a first glass plate and a second glass plate and an interlayer film arranged between the first glass plate and the second glass plate, and the interlayer film comprises an infrared absorber.

[9] The laminated glass according to the above [8], wherein the infrared absorber comprises a first infrared absorber having a maximum absorption wavelength peak of 900 to 1300 nm.

[10] The laminated glass according to the above [8] or [9], wherein the infrared absorber comprises heat-shielding particles.

[11] The laminated glass according to any one of the above [1] to [10], wherein the glass comprises a first glass plate and a second glass plate and an interlayer film arranged between the first glass plate and the second glass plate, the interlayer film comprises a first resin layer arranged on one face side, a second resin layer arranged on the other face side, and an infrared reflective layer provided between the first resin layer and the second resin layer, and at least one of the first resin layer and the second resin layer comprises the infrared absorber.

[12] A vehicle system comprising the laminated glass according to any one of the above [1] to [11] provided in a vehicle body, a light source provided in the interior of the vehicle body and emitting infrared radiation, and a light-receiving unit provided in the interior of the vehicle body and receiving a reflected light from an observation object having been irradiated with the infrared radiation; and detecting a state of the observation object by the reflected light received by the light-receiving unit.

[13] The vehicle system according to the above [12], wherein the vehicle is an automobile, and the laminated glass constitutes any one of a windshield, a side glass, and a rear glass.

[14] The vehicle system according to the above [13], wherein the laminated glass constitutes the windshield.

[15] The vehicle system according to any one of the above [12] to [14], further comprising a face recognition system for recognizing a face of the observation object by the reflected light received.

[16] The vehicle system according to any one of the above [12] to [15], wherein the reflected light from the observation object is received by the light-receiving unit through reflection by the laminated glass.

Advantageous Effects of Invention

According to the present invention, there can be provided a laminated glass by which monitoring can be properly carried out using infrared radiation even when an infrared monitoring system is introduced in various vehicles.

DESCRIPTION OF EMBODIMENTS

Figure 1:
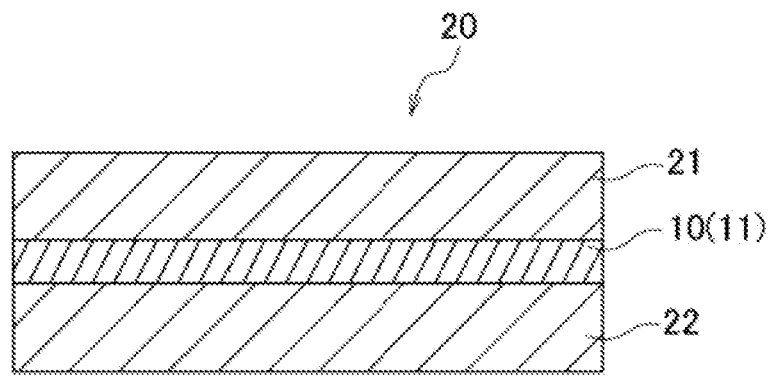
FIG. 1 is a cross-sectional view of a laminated glass according to one embodiment of the present invention.

Hereinafter, the present invention will be described in detail using embodiments.
<Laminated Glass>
(T/R Rate)

The laminated glass of the present invention has a T/R rate of larger than 1, the T/R rate being calculated from the following formula (A):

$$T/R \text{ rate} = \log 10(T/100)/\log 10(R/100) \qquad (A)$$

when an average transmittance through one face in a prescribed infrared wavelength region is represented by T, and a maximum reflectance at an incident angle of 60° on the other face in the prescribed wavelength region is represented by R.

In the above formula (1), as the average transmittance (T) and the maximum reflectance (R) decrease, the absolute values log 10(T/100) and log 10(R/100) become larger, respectively, and a T/R rate of larger than 1 means that the maximum reflectance (R) of the laminated glass is larger than the average transmittance (T). On that account, in the laminated glass of the present invention, the average transmittance (T) relatively decreases, and infrared radiation in the prescribed wavelength region, which is incident on one face of the laminated glass, is sufficiently shielded. Accordingly, infrared radiation in the prescribed wavelength region, which is contained in outside light such as sunlight incident on one face of the laminated glass (e.g., face on the vehicle exterior side), is sufficiently shielded by the laminated glass. Further, the laminated glass can sufficiently reflect infrared radiation in the prescribed wavelength region, which is incident at an angle of 60° on the other face (e.g., face on the vehicle interior side).

The laminated glass has a first glass plate and a second glass plate, and in various vehicles, the first glass plate is arranged on the vehicle exterior side, and the second glass plate is arranged on the vehicle interior side. The surface of the first glass plate preferably becomes the aforesaid one face, and the surface of the second glass plate preferably becomes the other face. The same shall apply to the following description.

The reason why the incident angle is 60° in the measurement of the reflectance is that infrared radiation used for monitoring in the infrared monitoring system is often inclined at a certain angle and made incident on the laminated glass.

Methods for measuring the average transmittance (T) and the maximum reflectance (R) are specifically as shown in the examples.

Specifically describing embodiments of the present invention, the laminated glass according to one embodiment of the present invention has a T/R rate (A) of larger than 1, the T/R rate (A) being calculated from the following formula:

$$T/R \text{ rate } (A) = \log 10(TA/100)/\log 10(RA/100) \quad (1)$$

wherein an average transmittance at a wavelength of 900 to 1300 nm through one face is represented by TA, and a maximum reflectance at a wavelength of 900 to 1300 nm at an incident angle of 60° on the other face is represented by RA.

When an infrared monitoring system is introduced in the interiors of various vehicles such as an automobile, infrared radiation of 900 to 1300 nm is preferably used for monitoring. Infrared radiation of 900 to 1300 nm cannot be recognized with human eyes but is easily reflected by the human skin, and for example, the infrared radiation is suitable for monitoring occupants such as a driver. On the other hand, the laminated glass satisfying the formula (1) can sufficiently shield infrared radiation having a wavelength of 900 to 1300 nm contained in outside light such as sunlight incident on one face of the laminated glass.

Accordingly, even when an infrared monitoring system for monitoring a driver, etc. is introduced in the interior of a vehicle, outside light such as sunlight is prevented from becoming noise during the monitoring and proper monitoring is carried out, by using the laminated glass of the present embodiment satisfying the formula (1). Specifically, for example, in the face recognition system, whether the driver is dozing off, etc. are detected by eyelid movement or the like, and by using the laminated glass of the present embodiment, such eyelid movement or the like can also be detected with less noise.

In the infrared monitoring system, infrared radiation is sometimes used after reflected by a window glass constituted of a laminated glass, and since the laminated glass of the present embodiment satisfies the formula (1), it can sufficiently reflect infrared radiation of 900 to 1300 nm on the other face (i.e., face on the vehicle interior side). On that account, even in the case where infrared radiation for monitoring is used after reflected by a window glass, the infrared radiation is sufficiently reflected, and proper monitoring can be achieved with high accuracy.

In order to reduce noise to achieve infrared monitoring with high accuracy, the T/R rate (A) is preferably larger than 2.3, more preferably larger than 3.6, and preferably larger than 8. In order to maintain visible light transmittance, etc. sufficiently high, the T/R rate (A) is, for example, 20 or less, and preferably 15 or less.

In the laminated glass according to another embodiment of the present invention, at least one of the T/R rates (1) to (4) calculated from the following formulae (2-1) to (2-4) is larger than 1.

$$T/R \text{ rate } (1) = \log 10(T1/100)/\log 10(R1/100) \quad (2\text{-}1)$$

$$T/R \text{ rate } (2) = \log 10(T2/100)/\log 10(R2/100) \quad (2\text{-}2)$$

$$T/R \text{ rate } (3) = \log 10(T3/100)/\log 10(R3/100) \quad (2\text{-}3)$$

$$T/R \text{ rate } (4) = \log 10(T4/100)/\log 10(R4/100) \quad (2\text{-}4)$$

In the formula (2-1), T1 represents an average transmittance at a wavelength of 900 to 1000 nm through one face of the laminated glass, and R1 represents a maximum reflectance at a wavelength of 900 to 1000 nm at an incident angle of 60° on the other face of the laminated glass.

In the formula (2-2), T2 represents an average transmittance at a wavelength of 1000 to 1100 nm through one face of the laminated glass, and R2 represents a maximum reflectance at a wavelength of 1000 to 1100 nm at an incident angle of 60° on the other face of the laminated glass.

In the formula (2-3), T3 represents an average transmittance at a wavelength of 1100 to 1200 nm through one face of the laminated glass, and R3 represents a maximum reflectance at a wavelength of 1100 to 1200 nm at an incident angle of 60° on the other face of the laminated glass.

In the formula (2-4), T4 represents an average transmittance at a wavelength of 1200 to 1300 nm through one face of the laminated glass, and RA represents a maximum reflectance at a wavelength of 1200 to 1300 nm at an incident angle of 60° on the other face of the laminated glass.

As the infrared light source for use in the infrared monitoring system, LED is often used, and LED generally has a narrow emission wavelength region. In the case where infrared radiation of a narrow wavelength region is selectively used by the use of such LED, high-accuracy monitoring can be achieved with less noise by making at least one of the T/R rates (1) to (4) larger than 1 and thereby controlling infrared transmittance and reflectance in the specific wavelength region.

When at least one of the T/R rates (1) to (4) is made larger than 1 as described above, the maximum emission wavelength of the radiation light source used in the infrared monitoring system is preferably set to be within a wavelength region in which any of the T/R rates (1) to (4) is larger than 1. That is to say, when the T/R rate (1) is larger than 1, the maximum emission wavelength of the light source used is preferably set to 900 to 1000 nm. When the T/R rate (2) is larger than 1, the maximum emission wavelength of the light source used is preferably set to 1000 to 1100 nm. When the T/R rate (3) is larger than 1, the maximum emission wavelength of the light source used is preferably set to 1100 to 1200 nm. When the T/R rate (4) is larger than 1, the maximum emission wavelength of the light source used is preferably set to 1200 to 1300 nm.

In the laminated glass of one embodiment of the present invention, preferably two or more, more preferably three or more, of the T/R rates (1) to (4) are each larger than 1. When the T/R rate is larger than 1 over a wide wavelength range as above, noise is further reduced, and high-accuracy monitoring can be achieved.

When two or three of the T/R rates are each larger than 1, the T/R rate in the adjacent wavelength region is preferably larger than 1. That is to say, it is preferable that the T/R rate (1) and the T/R rate (2), the T/R rate (2) and the T/R rate (3), or the T/R rate (3) and the T/R rate (4) be each larger than 1.

It is more preferable that the T/R rate (1) and the T/R rate (2) and the T/R rate (3), or the T/R rate (2) and the T/R rate (3) and the T/R rate (4) be each larger than 1. When the T/R rates in the wavelength regions adjacent to each other are each made larger than 1 as described above, the T/R rate can be continuously made large over a wide wavelength range, and therefore, high-accuracy monitoring can be achieved with much less noise. In order to achieve high-accuracy monitoring with much less noise, each of the T/R rates (1) to (4) is preferably larger than 1.

When at least one of the T/R rates (1) to (4) is larger than 1 as described above, the aforesaid T/R rate (A) is not always necessarily larger than 1, but the T/R rate (A) is preferably larger than 1. When at least one of the T/R rates (1) to (4) is larger than 1 and the T/R rate (A) is also larger than 1, high-accuracy monitoring is easily achieved with less noise. In that case, it is more preferable that at least two of the T/R rates (1) to (4) be each larger than 1, it is still more preferable that at least three of the T/R rates (1) to (4) be each larger than 1, and it is even more preferable that each of the T/R rates of (1) to (4) be larger than 1, as described above. Specific combinations of cases where at least two or three of the T/R rates (1) to (4) are each larger than 1 are as described above.

In the laminated glass of the present embodiment, the T/R rate (1) is preferably larger than 2.3, more preferably larger than 3.6, and preferably larger than 8. When the T/R rate (1) is increased as above, noise can be reduced to achieve proper infrared monitoring, and especially when a light source having a maximum emission wavelength of 900 to 1000 nm is used, infrared monitoring of higher accuracy can be carried out. In order to maintain visible light transmittance, etc. sufficiently high, the T/R rate (1) is, for example, 20 or less, and preferably 15 or less.

The T/R rate (2) is preferably larger than 2.3, more preferably larger than 3.6, and still more preferably larger than 8.0. When the T/R rate (2) is increased as above, noise can be reduced to achieve infrared monitoring of high accuracy, and especially when a light source having a maximum emission wavelength of 1000 to 1100 nm is used, infrared monitoring of higher accuracy can be carried out. In order to maintain visible light transmittance, etc. sufficiently high, the T/R rate (2) is, for example, 20 or less, and preferably 15 or less.

The T/R rate (3) is preferably larger than 2.3, more preferably larger than 3.6, and still more preferably larger than 8.0. When the T/R rate (3) is increased as above, noise can be reduced to achieve infrared monitoring of high accuracy, and especially when a light source having a maximum emission wavelength of 1100 to 1200 nm is used, infrared monitoring of higher accuracy can be carried out. In order to maintain visible light transmittance, etc. sufficiently high, the T/R rate (3) is, for example, 20 or less, and preferably 15 or less.

The T/R rate (4) is preferably larger than 2.3, more preferably larger than 3.6, and still more preferably larger than 8.0. When the T/R rate (4) is increased as above, noise can be reduced to achieve infrared monitoring of high accuracy, and especially when a light source having a maximum emission wavelength of 1200 to 1300 nm is used, infrared monitoring of higher accuracy can be carried out. In order to maintain visible light transmittance, etc. sufficiently high, the T/R rate (4) is, for example, 20 or less, and preferably 15 or less.

The laminated glass according to a further embodiment of the present invention is a laminated glass used in an infrared monitoring system, and a T/R rate (B) calculated from the following formula (3) is larger than 1.

$$T/R\ rate\ (B) = \log 10(TB/100)/\log 10(RB/100) \quad (3)$$

In the formula (3), TB represents an average transmittance through one face of the laminated glass, at ±50 nm of the maximum emission wavelength, and RB represents a maximum reflectance at an incident angle of 60° on the other face of the laminated glass, at ±50 nm of the maximum emission wavelength. The maximum emission wavelength is a wavelength at which the emission intensity of the infrared light source used in the monitoring becomes the highest.

As described above, as the infrared light source for use in the infrared monitoring system, LED is often used, and LED generally has a narrow emission wavelength region. On that account, by making the T/R rate (B) at the maximum emission wavelength of the light source and in its neighboring wavelength region larger than 1, monitoring with less noise and high accuracy can be achieved.

The T/R rate (B) is preferably larger than 2.3, more preferably larger than 3.6, and preferably larger than 8. When the T/R rate (B) is increased as above, noise can be reduced to achieve infrared monitoring of high accuracy. In order to maintain visible light transmittance, etc. sufficiently high, the T/R rate (B) is, for example, 20 or less, and preferably 15 or less.

(Average Transmittance)

In the present invention, the average transmittance TA at a wavelength of 900 to 1300 nm is preferably 25% or less, more preferably 20% or less, and still more preferably 15% or less. When the average transmittance TA is decreased, the aforesaid T/R rate (A), T/R rates (1) to (4) and T/R rate (B) are each easily made larger than 1. From the viewpoint of properly performing infrared monitoring, the average transmittance TA at a wavelength of 900 to 1300 nm is preferably lower, but from the viewpoint of increasing visible light transmittance of the laminated glass, it is, for example, 1% or more, preferably 3% or more, and more preferably 5% or more.

In the present invention, the average transmittance T in a wavelength region in which the T/R rates (1) to (4) and the T/R rate (B) are each larger than 1 as described above (e.g., average transmittance T1 at 900 to 1000 nm when the T/R rate (1) is larger than 1) is preferably 25% or less, more preferably 20% or less, and still more preferably 15% or less. When the average transmittance T in each wavelength region is decreased, the T/R rates (1) to (4) and the T/R rate (B) are each easily made larger than 1.

From the viewpoint of properly performing infrared monitoring, the average transmittance T in a wavelength region in which the T/R rates (1) to (4) and the T/R rate (B) are each larger than 1 is preferably lower, but from the viewpoint of increasing visible light transmittance of the laminated glass, it is, for example, 1% or more, preferably 3% or more, and more preferably 5% or more.

(Maximum Reflectance)

The maximum reflectance RA at a wavelength of 900 to 1300 nm is, for example, 12% or more, preferably 30% or more, more preferably 50% or more, still more preferably 60% or more, and particularly preferably 73% or more. When the maximum reflectance RA is increased as above, the T/R rate (A), the T/R rates (1) to (4), and the T/R rate (B) are each easily made larger than 1. From the viewpoint of properly performing infrared monitoring, the maximum reflectance RA at a wavelength of 900 to 1300 nm is preferably higher, but practically, it is 95% or less, or may be 85% or less.

The maximum reflectance R in a wavelength region in which the T/R rates (1) to (4) and the T/R rate (B) are each larger than 1 as described above (e.g., maximum reflectance R1 at 900 to 1000 nm when the T/R rate (1) is larger than 1) is, for example, 8% or more, preferably 30% or more, more preferably 50% or more, still more preferably 60% or more, and particularly preferably 73% or more. When the maximum reflectance R is increased as above, the T/R rates (1) to (4) and the T/R rate (B) are each easily made larger than 1.

From the viewpoint of properly performing infrared monitoring, the maximum reflectance R in a wavelength region in which the T/R rates (1) to (4) and the T/R rate (B) are each larger than 1 is preferably higher, but practically, it is 95% or less, or may be 85% or less.

(Visible Light Transmittance)

The visible light transmittance (Tv) of the laminated glass of the present invention is preferably 60% or more in order to preferably use the glass as a window glass, and in order to preferably use the glass as a windshield of an automobile, it is more preferably 70% or more, still more preferably 75% or more, and even more preferably 80% or more. On the other hand, from the viewpoint of transparency of a window glass, the visible light transmittance is preferably higher, but in order to decrease the transmittance in the prescribed infrared wavelength region as described above or in order to easily enhance heat shielding property, it is preferably 99% or less, more preferably 95% or less, and still more preferably 92% or less.

The visible light transmittance (Tv) may be measured in accordance with JIS R3212 (2015), and a specific measuring method therefor is as shown in the examples.

(Tts)

For example, in order to prevent the vehicle interior from being heated by outside light such as sunlight, the laminated glass of the present invention is desirably enhanced in heat shielding property. From such a viewpoint, Tts of the laminated glass is, for example, 70% or less, preferably 65% or less, more preferably 60% or less, and still more preferably 55% or less. Tts is an abbreviation for Total solar energy transmitted through a glazing, and is an index indicating heat shielding property. Since Tts of the laminated glass is the aforesaid upper limit or less, the laminated glass has sufficient heat shielding property. From the viewpoint of securing a visible light transmittance of a certain level or higher, Tts is, for example, 30% or more, preferably 40% or more, more preferably 45% or more, and still more preferably 50% or more.

In the present invention, by appropriately adjusting the type of the infrared absorber compounded in the interlayer film, the type of the infrared reflective layer, etc. as described later, Tts can also be decreased while enhancing transparency. Specifically, while securing a visible light transmittance of 70% or more, Tts can be decreased to, for example, 65% or less, 60% or less, or 55% or less. Tts may be measured in accordance with ISO 13837 (2008), and a specific measuring method therefor is as shown in the examples.

(Tds (1.5))

Tds (1.5) is a solar transmittance Tds (1.5) of a laminated glass at a wavelength of 300 to 2500 nm. In order to enhance heat shielding property, Tds (1.5) of the laminated glass of the present invention is, for example, 60% or less, preferably 55% or less, more preferably 50% or less, and still more preferably 45% or less. From the viewpoint of securing a visible light transmittance of a certain level or higher, Tds (1.5) is, for example, 20% or more, preferably 30% or more, more preferably 35% or more, and still more preferably 40% or more.

In the present invention, while enhancing transparency, Tds (1.5) can also be decreased as described above, and specifically, while securing a visible light transmittance of 70% or more, Tds (1.5) can be decreased to, for example, 55% or less, 50% or less, or 45% or less.

The solar transmittance Tds (1.5) may be measured in accordance with ISO 13837 (2008), and a specific measuring method therefor is as shown in the examples.

Next, a constitution of the laminated glass of the present invention will be described in detail.

The laminated glass comprises a pair of glass plates (first and second glasses) and an interlayer film arranged between the pair of glass plates. The pair of glass plates are bonded with the interlayer film to constitute the laminated glass.

(Infrared Absorber)

The laminated glass of the present invention preferably contains an infrared absorber. Since the laminated glass contains an infrared absorber, the transmittance in the wavelength region of 900 to 1300 nm is decreased, and the aforesaid each T/R rate is easily made larger than 1. Moreover, heat shielding property, etc. are also easily enhanced. The infrared absorber is preferably contained in the interlayer film.

Examples of the infrared absorbers include an organic dye and a heat-shielding particle. The organic dye is preferably an organic dye containing a metallic element. The organic dyes may be used singly or may be used in combination of two or more. When the organic dye contains a metallic element, the metallic element may be of one or two or more kinds. The metallic element may be contained in the form of a compound such as a metal oxide.

The metallic element may be a transition element, or may be a typical element. Examples of the transition elements include group 4 elements, group 5 elements, group 6 elements, group 7 elements, group 8 elements, group 9 elements, group 10 elements, group 11 elements, and group 12 elements. Examples of the typical elements include group 13 elements and group 14 elements. Specific examples of the metallic elements include copper, zinc, vanadium and tin.

Examples of the organic dyes include a phthalocyanine compound, a naphthalocyanine compound, and an anthracyanine compound.

The phthalocyanine compound is phthalocyanine or a phthalocyanine derivative having a phthalocyanine skeleton, and preferably, metallic elements are contained in them. The naphthalocyanine compound is naphthalocyanine or a naphthalocyanine derivative having a naphthalocyanine skeleton, and preferably, metallic elements are contained in them. The anthracyanine compound is anthracyanine or an anthracyanine derivative having an anthracyanine skeleton, and preferably, metallic elements are contained in them.

In these organic dyes, the metallic element preferably becomes a central metal of the phthalocyanine skeleton, the naphthalocyanine skeleton or the anthracyanine skeleton.

Among the above organic dyes, a phthalocyanine compound containing a metallic element is preferable as the organic dye.

The heat-shielding particle is a material capable of absorbing infrared radiation having a wavelength of 780 nm or more, that is, heat ray. The heat-shielding particle is composed of an inorganic material, and specific examples thereof include metal oxide particles, and particles other than the metal oxide particles, such as lanthanum hexaboride (LaB6). Examples of the metal oxide particles include tin oxide particles, such as aluminum-doped tin oxide particles, indium-doped tin oxide particles, and antimony-doped tin oxide particles (ATO particles); zinc oxide particles, such as gallium-doped zinc oxide particles (GZO particles), indium-doped zinc oxide particles (IZO particles), aluminum-doped zinc oxide particles (AZO particles), tin-doped zinc oxide particles, and silicon-doped zinc oxide particles; titanium oxide particles, such as niobium-doped titanium oxide particles; indium oxide particles, such as tin-doped indium oxide particles (ITO particles); and tungsten oxide particles, such as sodium-doped tungsten oxide particles, cesium-doped tungsten oxide particles (CWO particles), thallium-doped tungsten oxide particles, and rubidium-doped tungsten oxide particles. Heat-shielding particles other than these may be used. The heat-shielding materials may be used singly, or may be used in combination of two or more.

Among these, metal oxide particles are preferably used because they have a high heat ray-shielding function, and at least one selected from the group consisting of ATO particles, GZO particle, ITO particles and CWO particles is more preferably used, and ITO particles or CWO particles are still more preferably used.

A preferred lower limit of an average particle diameter of the heat-shielding particles is 10 nm, a more preferred lower limit thereof is 20 nm, a preferred upper limit thereof is 100 nm, a more preferred upper limit thereof is 80 nm, and a still more preferred upper limit thereof is 50 nm. When the average particle diameter is the aforesaid preferred lower limit or more, heat ray-shielding property can be sufficiently enhanced. When the average particle diameter is the aforesaid preferred upper limit or less, visible light is not easily shielded by the heat-shielding material, and the aforesaid visible light transmittance is easily adjusted to be within the prescribed range.

The "average particle diameter" indicates a volume-average particle diameter. The average particle diameter can be measured using a particle size distribution measuring device ("UPA-EX150" manufactured by NIKKISO CO., LTD.) or the like.

In the present invention, by appropriately adjusting absorption property of the infrared absorber, the aforesaid T/R rate (A), T/R rates (1) to (4), and the T/R rate (B) can be each made larger than 1. For example, by using an infrared absorber having a maximum absorption wavelength peak ranging from 900 to 1300 nm (also referred to as a "first infrared absorber" hereinafter), the T/R rate (A), the T/R rates (1) to (4), and the T/R rate (B) are each easily made larger than 1.

Specifically, for example, by using the first infrared absorber having a maximum absorption wavelength peak of 900 to 1100 nm, the T/R rates (1) and (2) are each easily made larger than 1. More specifically, by using the first infrared absorber having a maximum absorption wavelength peak of 1000 to 1100 nm, the T/R rate (2) is easily made larger than 1, and by using the first infrared absorber having a maximum absorption wavelength peak of 900 to 1000 nm, the T/R rate (1) is easily made larger than 1. Furthermore, for example, by using the first infrared absorber having a maximum absorption wavelength peak of 1100 to 1300 nm, the T/R rates (3) and (4) can be lowered.

As the first infrared absorber, an organic dye may be used, particularly, an organic dye having a metallic dye is preferable, and a phthalocyanine compound having a metallic element is more preferable. By appropriately adjusting a substituent to be substituted in the basic skeleton or the type of the metallic element, the maximum absorption wavelength peak of the organic dye can be adjusted, and for example, in the case of a phthalocyanine compound, by appropriately changing a substituent to be substituted in the phthalocyanine skeleton or the type of the central metal, the maximum absorption wavelength peak can be adjusted to be within the range of 900 to 1300 nm.

As the first infrared absorber, a commercial product may be used, and examples of the phthalocyanine compounds having a metallic element include trade name "TIR-915" (maximum absorption wavelength peak: about 950 nm), trade name "TX-EX-902K" (maximum absorption wavelength peak: 1026 nm), trade name "TX-EX-931" (maximum absorption wavelength peak: 945 nm), and trade name "IR-924" (all manufactured by NIPPON SHOKUBAI CO., LTD.).

As a matter of course, the infrared absorber is not limited to the first infrared absorber, and an infrared absorber having a maximum absorption wavelength peak of 780 nm or more and less than 900 nm (also referred to as a "second infrared absorber" hereinafter) may be used. As the second infrared absorber also, an organic dye, particularly an organic dye having a metallic element, is preferable, and a phthalocyanine compound having a metallic dye is more preferable, among the aforesaid ones.

As the second infrared absorber, a commercial product may be used, and examples of the phthalocyanine compounds having a metallic element include trade name "EXCOLOR IR-14" (maximum absorption wavelength peak: 834 nm), trade name "TX-EX-W801" (maximum absorption wavelength peak: 785 nm) (both manufactured by NIPPON SHOKUBAI CO., LTD.), and trade name "NIR-43V" (manufactured by YAMADA CHEMICAL CO., LTD.).

The second infrared absorber is preferably used in combination with, typically, the first infrared absorber, or is preferably used in combination with the heat-shielding particles.

The maximum absorption wavelength peak of the infrared absorber can be measured by the following method. With 100 parts by mass of chloroform is mixed 0.0002 to 0.002 part by mass of a compound to be measured, thereby obtaining a chloroform solution. The resulting chloroform solution is placed in a quartz cell for a spectrophotometer of an optical path length of 1.0 cm. Using a recording spectrophotometer ("U4100" manufactured by Hitachi Ltd.), a transmittance at 300 to 2500 nm is measured to determine a maximal absorption wavelength peak. The maximal absorption wavelength peak is a wavelength at which the transmittance shows a minimum value, and a plurality of such wavelengths sometimes exists, and in that case, the maximum absorption wavelength peak refers to a wavelength at which the minimum value is the smallest.

It is also preferable to use heat-shielding particles as the infrared absorber. The performance of the heat-shielding particles to absorb infrared radiation in the wavelength region of 900 to 1300 nm is not so high, but incidence of heat ray or infrared radiation can be effectively shielded. Therefore, by using the heat-shielding particles in combination with the aforesaid first infrared absorber or an infrared reflective layer described later, an increase in temperature on the vehicle interior side can be prevented by the particles while lowering the transmittance at 900 to 1300 nm.

[Absorber-Containing Layer]

The infrared absorber is preferably contained in the interlayer film. The interlayer film preferably has a resin layer containing the infrared absorber (also referred to as an "absorber-containing layer" hereinafter). The resin to form the absorber-containing layer is preferably a thermoplastic resin. That is to say, the absorber-containing layer preferably contains a thermoplastic resin in addition to the infrared absorber, and the infrared absorber is preferably dispersed or dissolved in the thermoplastic resin. Since the absorber-containing layer contains a thermoplastic resin, this layer easily functions as an adhesive layer, so that adhesion property to the glass plate or an infrared reflective layer described later is improved.

The content of the infrared absorber in the absorber-containing layer may be within a range such that the T/R rate (A), the T/R rates (1) to (4), and the T/R rate (B) can be adjusted to be in the aforesaid prescribed ranges, but it is, for example, 0.005 mass % or more and 1.5 mass % or less, preferably 0.01 mass % or more and 1.2 mass % or less, and more preferably 0.015 mass % or more and 1.0 mass % or less.

When two or more infrared absorbers are used, the total content of the two or more infrared absorbers may be in the above range.

(Thermoplastic Resin)

Examples of the thermoplastic resins include, but are not limited to, a polyvinyl acetal resin, an ethylene-vinyl acetate copolymer resin, an ionomer resin, a polyurethane resin, a thermoplastic elastomer, an acrylic resin, an acrylic-vinyl acetate copolymer resin, a polyvinyl alcohol resin, a polyolefin resin, a polyvinyl acetate resin, and a polystyrene resin. By using these resins, adhesion property to the glass plate is easily secured.

In the absorber-containing layer of the present invention, the thermoplastic resins may be used singly, or may be used in combination of two or more. Among these, at least one selected from the group consisting of a polyvinyl acetal resin and an ethylene-vinyl acetate copolymer resin is preferable, and from the viewpoint that excellent adhesion property to glasses is exhibited particularly when it is used in combination with a plasticizer, a polyvinyl acetal resin is more preferable.

(Polyvinyl Acetal Resin)

The polyvinyl acetal resin is not particularly limited as long as it is a polyvinyl acetal resin obtained by acetalizing polyvinyl alcohol with an aldehyde, but a polyvinyl butyral resin is preferable. A preferred lower limit of the degree of acetalization of the polyvinyl acetal resin is 40 mol %, a preferred upper limit thereof is 85 mol %, a more preferred lower limit thereof is 60 mol %, and a more preferred upper limit thereof is 75 mol %.

A preferred lower limit of the amount of a hydroxyl group in the polyvinyl acetal resin is 15 mol %, and a preferred upper limit thereof is 35 mol %. By setting the amount of a hydroxyl group to 15 mol % or more, adhesion property to the glass plate, etc. tends to be improved, and the penetration resistance of the laminated glass tends to be improved. By setting the amount of a hydroxyl group to 35 mol % or less, the laminated glass is prevented from becoming too hard. A more preferred lower limit of the amount of a hydroxyl group is 25 mol %, and a more preferred upper limit thereof is 33 mol %.

In the case where a polyvinyl butyral resin is used as the polyvinyl acetal resin as well, a preferred lower limit of the amount of a hydroxyl group is 15 mol %, a preferred upper limit thereof is 35 mol %, a more preferred lower limit thereof is 25 mol %, and a more preferred upper limit thereof is 33 mol %, from the same viewpoints.

The degree of acetalization and the amount of a hydroxyl group can be measured by the methods based on JIS K6728 "Testing methods for polyvinyl butyral".

The polyvinyl acetal resin can be prepared by acetalizing polyvinyl alcohol with an aldehyde. The polyvinyl alcohol is usually obtained by saponifying polyvinyl acetate, and polyvinyl alcohol having a degree of saponification of 80 to 99.8 mol % is generally used.

A preferred lower limit of the degree of polymerization of the polyvinyl acetal resin is 500, and a preferred upper limit thereof is 4000. By setting the degree of polymerization to 500 or more, penetration resistance of the laminated glass is improved. By setting the degree of polymerization to 4000 or less, forming for the laminated glass is facilitated. A more preferred lower limit of the degree of polymerization is 1000, and a more preferred upper limit thereof is 3600.

The aldehyde is not particularly limited, but in general, an aldehyde having 1 to 10 carbon atoms is preferably used. Examples of the aldehydes having 1 to 10 carbon atoms include, but are not limited to, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Among these, n-butyraldehyde, n-hexylaldehyde and n-valeraldehyde are preferable, and n-butyraldehyde is more preferable. These aldehydes may be used singly, or may be used in combination of two or more.

(Ethylene-Vinyl Acetate Copolymer Resin)

The ethylene-vinyl acetate copolymer resin may be a non-crosslinked ethylene-vinyl acetate copolymer resin, or may be a high-temperature crosslinked ethylene-vinyl acetate copolymer resin. As the ethylene-vinyl acetate copolymer resin, an ethylene-vinyl acetate modified resin, such as an ethylene-vinyl acetate copolymer saponification product or a hydrolyzate of ethylene-vinyl acetate, can also be used.

In the ethylene-vinyl acetate copolymer resin, the vinyl acetate content, as measured in accordance with JIS K 6730 "Testing Methods For Ethylene/vinyl Acetate Copolymer Materials" or JIS K 6924-2:1997, is preferably 10 to 50 mass %, and more preferably 20 to 40 mass %. By setting the vinyl acetate content to the lower limit or more, adhesion property to glasses is enhanced, and penetration resistance of the laminated glass tends to be improved. By setting the vinyl acetate content to the upper limit or less, breaking strength of the absorber-containing layer is increased, and impact resistance of the laminated glass is improved.

(Ionomer Resin)

The ionomer resin is not particularly limited, and various ionomer resins can be used. Specific examples include an ethylene-based ionomer, a styrene-based ionomer, a perfluorocarbon-based ionomer, a telechelic ionomer, and a polyurethane ionomer. Among these, an ethylene-based ionomer is preferable from the viewpoints of improvement in mechanical strength, durability, transparency, etc. of the laminated glass and excellent adhesion property to glasses.

As the ethylene-based ionomer, an ionomer of an ethylene-unsaturated carboxylic acid copolymer is preferably used because it is excellent in transparency and toughness. The ethylene-unsaturated carboxylic acid copolymer is a copolymer having at least a constituent unit derived from ethylene and a constituent unit derived from an unsaturated carboxylic acid, and it may have constituent units derived from other monomers.

Examples of the unsaturated carboxylic acids include acrylic acid, methacrylic acid and maleic acid, and preferable are acrylic acid and methacrylic acid, and particularly preferable is methacrylic acid. Examples of other monomers include acrylic ester, methacrylic ester and 1-butene.

When the amount of all the constituent units of the ethylene-unsaturated carboxylic acid copolymer is 100 mol %, the copolymer preferably has 75 to 99 mol % of constituent units derived from ethylene, and preferably has 1 to 25 mol % of constituent units derived from the unsaturated carboxylic acid.

The ionomer of the ethylene-unsaturated carboxylic acid copolymer is an ionomer resin obtained by neutralizing or crosslinking at least part of carboxyl groups of the ethylene-unsaturated carboxylic acid copolymer, with metallic ions, and the degree of neutralization of the carboxyl groups is usually 1 to 90%, and preferably 5 to 85%.

Examples of ion sources in the ionomer resin include alkali metals, such as lithium, sodium, potassium, rubidium and cesium, and polyvalent metals, such as magnesium, calcium and zinc, and preferable are sodium and zinc.

A method for producing the ionomer resin is not particularly limited and the ionomer resin can be produced by a conventionally known production method. For example, when an ionomer of an ethylene-unsaturated carboxylic acid copolymer is used as the ionomer resin, the ethylene-unsaturated carboxylic acid copolymer is produced by, for example, subjecting ethylene and an unsaturated carboxylic acid to radical copolymerization at a high temperature and a high pressure. The ethylene-unsaturated carboxylic acid copolymer and a metal compound containing the above ion source are reacted with each other, whereby an ionomer of the ethylene-unsaturated carboxylic acid copolymer can be produced.

(Polyurethane Resin)

Examples of the polyurethane resins include polyurethane obtained by reacting an isocyanate compound with a diol compound, and polyurethane obtained by reacting an isocyanate compound with a diol compound and further a chain length extender such as polyamine. The polyurethane resin may be one containing a sulfur atom. In that case, part or all of the above diol is preferably selected from the group consisting of polythiol and sulfur-containing polyol. The polyurethane resin can improve adhesion property to an organic glass. On that account, the polyurethane resin is preferably used when the glass plate is of an organic glass.

(Thermoplastic Elastomer)

Examples of the thermoplastic elastomers include a styrene-based thermoplastic elastomer and an aliphatic polyolefin. The styrene-based thermoplastic elastomer is not particularly limited, and a known one can be used. The styrene-based thermoplastic elastomer generally has a styrene monomer polymer block that becomes a hard segment and a conjugated diene compound polymer block or its hydrogenated block that becomes a soft segment. Specific examples of the styrene-based thermoplastic elastomers include a styrene-isoprene diblock copolymer, a styrene-butadiene diblock copolymer, a styrene-isoprene-styrene triblock copolymer, a styrene-butadiene/isoprene-styrene triblock copolymer, a styrene-butadiene-styrene triblock copolymer, and hydrogenation products thereof.

The aliphatic polyolefin may be a saturated aliphatic polyolefin, or may be an unsaturated aliphatic polyolefin. The aliphatic polyolefin may be a polyolefin using a chain olefin as a monomer, or may be a polyolefin using a cyclic olefin as a monomer. From the viewpoints of storage stability of the interlayer film and effective enhancement in sound shielding property, the aliphatic polyolefin is preferably a saturated aliphatic polyolefin.

Examples of materials of the aliphatic polyolefins include ethylene, propylene, 1-butene, trans-2-butene, cis-2-butene, 1-pentene, trans-2-pentene, cis-2-pentene, 1-hexene, trans-2-hexene, cis-2-hexene, trans-3-hexene, cis-3-hexene, 1-heptene, trans-2-heptene, cis-2-heptene, trans-3-heptene, cis-3-heptene, 1-octene, trans-2-octene, cis-2-octene, trans-3-octene, cis-3-octene, trans-4-octene, cis-4-octene, 1-nonene, trans-2-nonene, cis-2-nonene, trans-3-nonene, cis-3-nonene, trans-4-nonene, cis-4-nonene, 1-decene, trans-2-decene, cis-2-decene, trans-3-decene, cis-3-decene, trans-4-decene, cis-4-decene, trans-5-decene, cis-5-decene, 4-ethyl-1-pentene, and vinylcyclohexane.

(Plasticizer)

When the absorber-containing layer of the present invention contains a thermoplastic resin, it may further contain a plasticizer. When the absorber-containing layer contains a plasticizer, it becomes flexible, and as a result, the laminated glass is enhanced in flexibility and enhanced in penetration resistance. Moreover, it also becomes possible for the absorber-containing layer to exhibit high adhesion property to the glass plate. It is particularly effective to incorporate the plasticizer when a polyvinyl acetal resin is used as the thermoplastic resin.

Examples of the plasticizers include organic ester plasticizers, such as a monobasic organic acid ester and a polybasic organic acid ester, and phosphorus plasticizers, such as an organic phosphate plasticizer and an organic phosphite plasticizer. Among these, organic ester plasticizers are preferable.

Examples of the organic ester plasticizers include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, 1,2-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, triethylene glycol di-n-heptanoate, tetraethylene glycol di-n-heptanoate, triethylene glycol di-2-ethylbutyrate, dihexyl adipate, dioctyl adipate, hexyl cyclohexyl adipate, diisononyl adipate, heptylnonyl adipate, dibutyl sebacate, oil-modified sebacic alkyd, a mixture of phosphoric acid ester and adipic acid ester, and mixed type adipic acid ester. Examples of the mixed type adipic acid esters include adipic acid esters prepared from two or more alcohols selected from the group consisting of alkyl alcohols having 4 to 9 carbon atoms and cyclic alcohols having 4 to 9 carbon atoms.

Among the above plasticizers, triethylene glycol di-2-ethylhexanoate (3GO) is particularly preferably used.

The content of the plasticizer in the absorber-containing layer is not particularly limited, but a preferred lower limit is 20 parts by mass, and a preferred upper limit is 70 parts by mass, based on 100 parts by mass of the thermoplastic resin. When the content of the plasticizer is 20 parts by mass or more, the laminated glass becomes moderately flexible, and penetration resistance, etc. are improved. When the content of the plasticizer is 70 parts by mass or less, separation of the plasticizer from the absorber-containing layer is prevented. A more preferred lower limit of the content of the plasticizer is 35 parts by mass, and a more preferred upper limit thereof is 63 parts by mass.

In the absorber-containing layer, the resin, or the resin and the plasticizer become main components, and the total amount of the thermoplastic resin and the plasticizer is usually 70 mass % or more, preferably 80 mass % or more, and more preferably 90 mass % or more and less than 100 mass %, based on the total amount of the absorber-containing layer in the colored region. By setting the total amount to less than 100 mass %, the absorber-containing layer can contain the infrared absorber.

(Other Additives)

The absorber-containing layer may further contain additives, such as a colorant, an ultraviolet absorber, an antioxidant, a light stabilizer, a bond strength adjusting agent, a fluorescent brightener, and a crystal nucleating agent, as needed.

The interlayer film may have a single-layer structure constituted of a single-layer resin layer, or may have a multilayer structure constituted of a plurality of resin layers. When the interlayer film is constituted of a single-layer resin layer, this one resin layer preferably becomes the aforesaid absorber-containing layer. When the interlayer film is constituted of a plurality of resin layers, all the resin layers may contain an infrared absorber and may each become an absorber-containing layer, but at least one resin layer preferably becomes an absorber-containing layer.

The resin layer that does not contain an infrared absorber and does not become an absorber-containing layer is the same as the aforesaid absorber-containing layer except for containing no infrared absorber, and therefore, the description thereof is omitted.

When the interlayer film has a plurality of resin layers, the resin to form each resin layer may be appropriately selected from the resins listed above. The resins to form the resin layers may be different from each other, but they are preferably the same as each other.

Therefore, when the interlayer film has a plurality of resin layers, the resins to form the resin layers are each preferably a polyvinyl acetal resin or an ethylene-vinyl acetate copolymer resin, and more preferably a polyvinyl acetal resin.

When the interlayer film has a plurality of resin layers and each resin layer contains a plasticizer, the amounts or the types of the plasticizers in the resin layers may be the same as each other, or may be different from each other.

[Infrared Reflective Layer]

The laminated glass of the present invention preferably has an infrared reflective layer. The infrared reflective layer is preferably included in the interlayer film, and more preferably, it is included in such a manner that it is interposed between two resin layers. By arranging the infrared reflective layer between two resin layers, the infrared reflective layer is bonded by the two resin layers with high bond strength, so that the infrared reflective layer can be stably included in the interlayer film. Since the laminated glass of the present invention has the infrared reflective layer, infrared radiations incident on the other face and incident on one face are reflected, and the maximum reflectance R at 900 to 1300 nm becomes high, while the average transmittance T becomes low. On that account, the values of the T/R rate (A), the T/R rates (1) to (4), and the T/R rate (B) can be made large. Moreover, the heat shielding property is improved, and the values of the aforesaid Tts and Tds (1.5) are easily adjusted to be within the desired ranges.

The infrared reflective layer used in the present invention is not particularly limited as long as it has performance to reflect infrared radiation. It is preferable to use, as the infrared reflective layer, one having a low average transmittance TA at a wavelength of 900 to 1300 nm through one face and a high maximum reflectance at a wavelength of 900 to 1300 nm at an incident angle of 60° on the other face.

Because of excellent performance to reflect infrared radiation, the infrared reflective layer preferably has a property that at at least one wavelength in the range of 900 to 1300 nm, the infrared transmittance is 40% or less. The infrared transmittance of the infrared reflective layer used in each of the examples described later satisfies the above preferred conditions. At at least one wavelength in the range of 900 to 1300 nm, the infrared transmittance is more preferably 30% or less, and still more preferably 20% or less.

Examples of the infrared reflective layers include a resin film with a metal foil, a multilayer laminated film in which a metal layer and a dielectric layer are formed on a resin film, a film containing graphite, a multilayer resin film, a liquid crystal film, and a resin film containing infrared reflective particles. These films have performance to reflect infrared radiation.

The resin film with a metal foil has a resin film and a metal foil laminated on an outer surface of the resin film. Examples of materials of the resin films include polyethylene terephthalate, polyethylene naphthalate, polyvinyl acetal, an ethylene-vinyl acetate copolymer, an ethylene-acrylic copolymer, polyurethane, polyvinyl alcohol, polyolefin, polyvinyl chloride, and polyimide. Examples of materials of the metal foils include aluminum, copper, silver, gold, palladium, and alloys containing these.

The multilayer laminated film in which a metal layer and a dielectric layer are formed on a resin film is a multilayer laminated film in which arbitrary numbers of metal layers and dielectric layers are alternately laminated on a resin film. Examples of materials of the resin films in the multilayer laminated film include polyethylene, polypropylene, polylactic acid, poly(4-methylpentene-1), polyvinylidene fluoride, cyclic polyolefin, polymethyl methacrylate, polyvinyl chloride, polyvinyl alcohol, polyamides such as nylon 6, 11, 12, 66, polystyrene, polycarbonate, polyethylene terephthalate, polyethylene naphthalate, polyester, polyphenylene sulfide, and polyether imide.

Examples of materials of the metal layers in the multilayer laminated film include the same materials as the materials of the aforesaid metal foils in the resin film with a metal foil. On both surfaces or one surface of the metal layer, a coat layer of a metal or a mixed oxide can be provided. Examples of materials of the coat layers include $ZnO$, $Al_2O_3$, $Ga_2O_3$, $InO_3$, $MgO$, $Ti$, $NiCr$ and $Cu$. A material of the dielectric layer in the multilayer laminated film is, for example, indium oxide.

The multilayer resin film is a laminated film in which a plurality of resin films are laminated. Examples of materials of the multilayer resin films include the same materials as the materials of the aforesaid resin films in the multilayer laminated film. The number of the resin films laminated in the multilayer resin film is 2 or more, may be 3 or more, or may be 5 or more. The number of the resin films laminated in the multilayer resin film may be 1000 or less, may be 100 or less, or may be 50 or less.

The multilayer resin film may be a multilayer resin film in which 2 or more thermoplastic resin layers having different optical properties (refractive index) are laminated alternately or at random with an arbitrary number of layers. Such a multilayer resin film is constituted in such a manner that desired infrared reflection performance is obtained.

The liquid crystal film is, for example, a film in which an arbitrary number of cholesteric liquid crystal layers that reflect lights of arbitrary wavelengths are laminated. Such a liquid crystal film is constituted in such a manner that desired infrared reflection performance is obtained.

One of infrared reflective particles for use in the infrared reflective layer is, for example, a tabular particle having a micro- to nano-scale thickness. For example, in a resin film in which silver tabular nanoparticles are dispersed, a thickness of the particle, an area thereof, and a state of arrangement of the particles are controlled, whereby a resin film having infrared reflection performance is obtained.

The infrared reflective layer is preferably of a resin film with a metal foil, a multilayer laminated film, a multilayer resin film or a liquid crystal film among the aforesaid ones. These films are more excellent in infrared reflection performance. Therefore, by using these films, the values of the T/R rate (A), the T/R rates (1) to (4), and the T/R rate (B) are easily made much larger, and further, the values of the aforesaid Tts and Tds (1.5) are easily adjusted to be in the desired ranges.

Among the aforesaid films, the resin film with a metal foil and the multilayer resin film are more preferable, and the resin film with a metal foil is still more preferable. In the resin film with a metal foil, a metal foil is formed on a resin layer as described above, and therefore, it has excellent infrared reflection performance in all the wavelength regions of 900 to 1300 nm, so that all the values of the T/R rate (A), the T/R rates (1) to (4), and the T/R rate (B) are easily made large.

On the other hand, the multilayer resin film has excellent infrared reflection performance mainly in the wavelength region of 900 to 1100 nm. On that account, the values of the T/R rates (1) and (2), the T/R rate (A) and the T/R rate (B) are easily made large. Since the multilayer laminated film does not have a member to shield electromagnetic waves, electromagnetic wave transmission property can be secured. On that account, electromagnetic waves required in the automated operation, other communication, etc. can be prevented from being shielded by a window glass of an automobile.

The thickness of the infrared reflective layer is preferably 0.01 mm or more, more preferably 0.04 mm or more, still more preferably 0.07 mm or more, and preferably 0.3 mm or less, more preferably 0.2 mm or less, still more preferably 0.18 mm or less, particularly preferably 0.16 mm or less. When the thickness of the infrared reflective layer is the above lower limit or more, the values of the T/R rate (A), the T/R rates (1) to (4), and the T/R rate (B) are easily made large, and heat shielding property is also easily enhanced. When the thickness of the infrared reflective layer is the above upper limit or less, transparency of the laminated glass is enhanced, and the visible light transmittance is easily increased.

[Glass Plate]

The glass plate used in the laminated glass may be of any of an inorganic glass and an organic glass, but it is preferably of an inorganic glass. Examples of the inorganic glasses include, but are not limited to, clear glass, float plate glass, polished plate glass, figured glass, wire-reinforced plate glass, wired plate glass, and green glass.

As the organic glass, a glass called a resin glass is generally used, and examples thereof include, but are not limited to, organic glasses composed of resins such as polycarbonate, acrylic resin, acrylic copolymer resin and polyester.

The first and second glass plates used in the laminated glass may be composed of the same materials, or may be composed of different materials. For example, when one is of an inorganic glass, the other may be of an organic glass, but both the first and second glass plates are preferably of inorganic glasses, or organic glasses.

The thickness of each of the first and second glass plates is not particularly limited, but is, for example, about 0.1 to 15 mm, and preferably 0.5 to 5 mm. The thicknesses of the glass plates may be the same as each other, or may be different from each other, but they are preferably the same as each other.

[Layer Constitution]

Figure 2:
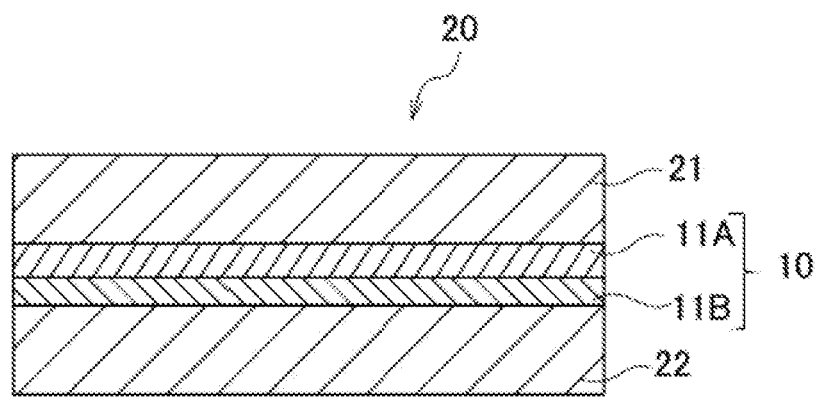
FIG. 2 is a cross-sectional view of a laminated glass according to another embodiment of the present invention.
Figure 3:
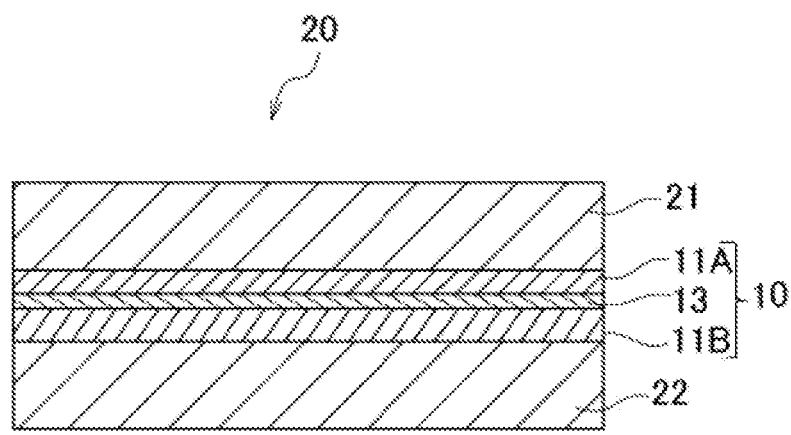
FIG. 3 is a cross-sectional view of a laminated glass according to a further embodiment of the present invention.

Lamination structures of the laminated glasses of the present invention are shown in FIGS. 1 to 3. As shown in FIGS. 1 to 3, the laminated glass 20 comprises a first glass plate and a second glass plate 21 and 22, and an interlayer film 10 arranged between the first and second glass plates 21 and 22, and the first and second glass plates 21 and 22 are bonded to each other with the interlayer film 10. When the laminated glass 20 is provided in a vehicle such as an automobile, the first glass plate 21 is arranged on the vehicle exterior side, and the second glass plate 22 is arranged on the vehicle interior side.

The interlayer film 10 may be formed from a single-layer resin layer 11, as shown in FIG. 1. When the interlayer film 10 is formed from the single-layer resin layer 11, the single-layer resin layer 11 preferably becomes an absorber-containing layer.

As shown in FIGS. 2 and 3, the interlayer film 10 preferably has a plurality of resin layers, and for example, the interlayer film 10 preferably has a first resin layer 11A on the first glass plate 21 side (that is, one face side) and a second resin layer 11B on the second glass plate 22 side (that is, the other face side). In this case, an infrared reflective layer 13 may be provided between the first and second resin layers 11A and 11B as shown in FIG. 3, but the infrared reflective layer may not be provided as shown in FIG. 2. However, from the viewpoint of making the T/R rate (A), the T/R rates (1) to (4), and the T/R rate (B) large, it is preferable to provide the infrared reflective layer 13.

When the interlayer film has the first and second resin layers 11A and 11B as described above, at least one of the first and second resin layers 11A and 11B preferably becomes an absorber-containing layer.

In the laminated glass 20 in which the infrared reflective layer 13 is provided as shown in FIG. 3, at least one of the first resin layer 11A and the second resin layer 11B is preferably an absorber-containing layer, but more preferably, the first resin layer 11A is an absorber-containing layer, or both the first and second resin layers 11A and 11B are absorber-containing layers. According to such a constitution, the average transmittance T can be decreased by the first resin layer 11A (absorber-containing layer) while increasing the maximum reflectance R by the infrared reflective layer 13, so that the T/R rate in each wavelength region is easily increased.

When the first resin layer 11A is an absorber-containing layer, details of the absorber-containing layer are as previously described, and it is particularly preferable that the first infrared absorber be contained in the absorber-containing layer (first resin layer 11A). When the first infrared absorber is contained in the first resin layer 11A, infrared radiation at 900 to 1300 nm is sufficiently absorbed by the first resin layer 11A, and the aforesaid T/R rate (A), T/R rates (1) to (4) and T/R rate (B) can be made large.

Further, when the absorber-containing layer that constitutes the first resin layer 11A contains the first infrared absorber, this layer also preferably contains heat-shielding particles in addition to the first infrared absorber.

Furthermore, the absorber-containing layer that constitutes the first resin layer 11A also preferably contains two or more first infrared absorbers different from each other in maximum absorption wavelength peak.

In an embodiment in which the first resin layer 11A is an absorber-containing layer and the infrared reflective layer 13 is provided as shown in FIG. 3, a constitution in which the absorber-containing layer that constitutes the first resin layer 11A contains at least one of the first infrared absorber and the heat-shielding particles is also preferable. According to such a constitution, the average transmittance T can be decreased while making the reflectance R large by both the infrared reflective layer 13 and the absorber-containing layer, and therefore, the aforesaid T/R rate (A), T/R rates (1) to (4) and T/R rate (B) easily become much larger.

By providing the infrared reflective layer 13, the aforesaid T/R rate (A), T/R rates (1) to (4) and T/R rate (B) can be made large even when infrared radiation in the wavelength region of 900 to 1300 nm is not actively absorbed by the first infrared absorber in the first resin layer 11A. Accordingly, the first resin layer 11A (absorber-containing layer) may not contain the first infrared absorber, but an embodiment in which the first infrared absorber is contained is also preferable, or an embodiment in which both the first infrared absorber and the heat-shielding particles are contained is also preferable.

The content of the infrared absorber in the absorber-containing layer that constitutes the first resin layer 11A is, for example, 0.005 mass % or more and 0.6 mass % or less, preferably 0.01 mass % or more and 0.4 mass % or less, and more preferably 0.015 mass % or more and 0.3 mass % or less.

The content of the first infrared absorber in the first resin layer 11A is preferably 0.005 mass % or more and 0.3 mass % or less, more preferably 0.01 mass % or more and 0.2 mass % or less, and still more preferably 0.015 mass % or more and 0.1 mass % or less. By setting the content of the first infrared absorber to be within the above range, the average transmittance T at the aforesaid each wavelength is decreased without greatly decreasing the maximum reflectance R at each wavelength, whereby T/R is easily made large.

When the first resin layer 11A contains the heat-shielding particles, the content of the heat-shielding particles in the absorber-containing layer that constitutes the first resin layer 11A is preferably 0.005 mass % or more and 0.5 mass % or less, more preferably 0.01 mass % or more and 0.4 mass % or less, and still more preferably 0.015 mass % or more and 0.2 mass % or less. By setting the content of the heat-shielding particles to be within the above range, the average transmittance T at the aforesaid each wavelength is decreased without greatly decreasing the reflectance R, whereby T/R is easily made large.

When the absorber-containing layer that constitutes the first resin layer 11A contains both the first infrared absorber and the heat-shielding particles, the mass rate of the heat-shielding particles to the first infrared absorber (heat-shielding particles/first infrared absorber) is preferably 0.25 or more and 15 or less, more preferably 0.5 or more and 10 or less, and still more preferably 0.7 or more and 8 or less.

As the heat-shielding particles for use in the first resin layer 11A, CWO is more preferable. Among the heat-shielding particles, CWO has a high shield factor against infrared radiation of 900 to 1300 nm, and therefore, by allowing the first resin layer 11A to contain CWO, the average transmittance T is further lowered easily.

When the infrared reflective layer 13 is provided as shown in FIG. 3, an embodiment in which the second resin layer 11B is an absorber-containing layer is also preferable. When the second resin layer 11B is an absorber-containing layer, infrared radiation incident on the other face (surface of the second glass plate 22) is partially absorbed by the second resin layer 11B, but by providing the infrared reflective layer 13, the value of the maximum reflectance R at each wavelength in the infrared region can be maintained high. On that account, the aforesaid T/R rate (A), T/R rates (1) to (4) and T/R rate (B) can be made large.

In the above each embodiment, the absorber-containing layer that constitutes the second resin layer 11B preferably contains the heat-shielding particles as the infrared absorber. By using the heat-shielding particles, the amount of infrared radiation that is incident on the surface of the second glass plate 22 and absorbed by the second resin layer 11B can be reduced. Moreover, heat ray incident from the outside is absorbed, and an increase in temperature inside the vehicle can also be prevented.

The content of the infrared absorber in the absorber-containing layer (second resin layer 11B) is, for example, 0.005 mass % or more and 1.5 mass % or less, preferably 0.01 mass % or more and 1.2 mass % or less, and more preferably 0.015 mass % or more and 1.0 mass % or less.

The content of the heat-shielding particles in the second resin layer 11B is preferably 0.005 mass % or more and 1.4 mass % or less, more preferably 0.1 mass % or more and 1.0 mass % or less, and still more preferably 0.15 mass % or more and 0.9 mass % or less. By setting the content of the heat-shielding particles to be within the above range, the average transmittance T at the aforesaid each wavelength is decreased without greatly decreasing the maximum reflectance R, whereby the T/R rate is easily made large. Moreover, heat ray incident from the outside is sufficiently absorbed, and an increase in temperature inside the vehicle is easily prevented.

The absorber-containing layer that constitutes the second resin layer 11B may contain, in addition to the endothermic particles, at least one of the first and second infrared absorbers (that is, infrared absorber having a maximum absorption wavelength peak of 780 to 1300 nm), but even when such an absorber is contained, it is preferable to reduce the amount thereof, or it is preferable that such an absorber should not be contained. By reducing the amount of the first and second infrared absorbers, a decrease in the visible light transmittance or the T/R rate can be prevented.

Specifically, the total content of the first and second infrared absorbers is preferably less than 0.1 mass %, more preferably less than 0.05 mass %, still more preferably less than 0.01 mass %, and most preferably 0 mass %.

When the infrared reflective layer 13 is provided as shown in FIG. 3, an embodiment in which both the first and second resin layers 11A and 11B are absorber-containing layers is also preferable. In such an embodiment, constitutions of the first and second resin layers 11A and 11B that are absorber-containing layers are as previously described.

The constitution in which the interlayer film 10 has a plurality of resin layers as above has been described typically taking, as an example, a constitution in which the first and second resin layers 11A and 11B are provided as resin layers, but the constitution of the interlayer film 10 is not limited to the above constitution. For example, in the constitution shown in FIG. 2, a resin layer may be further provided between the first and second resin layers 11A and 11B, or a resin layer may be provided between the first resin layer 11A and the first glass plate 21, or between the second resin layer 11B and the second glass plate 22.

Also, in the constitution having an infrared reflective layer as shown in FIG. 3, a resin layer may be further provided between the first resin layer 11A and the infrared reflective layer 13, between the second resin layer 11B and the infrared reflective layer 13, between the first resin layer 11A and the first glass plate 21, or between the second resin layer 11B and the second glass plate 22.

When a resin layer is provided in addition to the first and second resin layers, various functions may be added to the resin layer (also referred to as a "third resin layer"). For example, by allowing the third resin layer to contain light-emitting particles that emit light when irradiated with excitation light, the interlayer film may be a light-emitting interlayer film. Alternatively, by using a polyvinyl acetal resin as a thermoplastic resin for use in the third resin layer and by appropriately adjusting the amount of a hydroxyl group or the plasticizer, the interlayer film may be of a so-called sound-shielding layer.

The thickness of the interlayer film is preferably 0.2 mm or more and 1.8 mm or less, more preferably 0.25 mm or more and 1.0 mm or less, and still more preferably 0.3 mm or more and 0.9 mm or less.

Regarding the thickness of the resin layer to constitute the interlayer film, when the resin layer (that is, absorber-containing layer) consists of one single layer, the thickness of the resin layer is preferably 0.2 mm or more and 1.5 mm or less, more preferably 0.25 mm or more and 1.0 mm or less, and still more preferably 0.3 mm or more and 0.9 mm or less, similarly to the interlayer film.

When the interlayer film is wedge-shaped as described later, the thickness varies, but the minimum thickness and the maximum thickness of the varied thicknesses are both preferably in the above range. The same shall apply to other layers.

When the resin layer to constitute the interlayer film consists of a plurality of layers, the thickness of each resin layer may be appropriately adjusted in such a manner that the thickness of the interlayer film is in the above range. For example, when the resin layer consists of two layers as shown in FIGS. 2 and 3, the thickness of each resin layer is preferably 0.05 mm or more and 1.5 mm or less, more preferably 0.15 mm or more and 1 mm or less, and still more preferably 0.25 mm or more and 0.6 mm or less. By setting the thickness of the resin layer to the above lower limit or more, infrared radiation is properly absorbed when the resin layer is, for example, an absorber-containing layer, and the T/R rate at each wavelength is easily made large. When the heat-shielding particles are contained, a sufficient heat-shielding effect is obtained. On the other hand, by setting the thickness to the above upper limit or less, visible light transmittance, etc. can also be increased.

Figure 4:
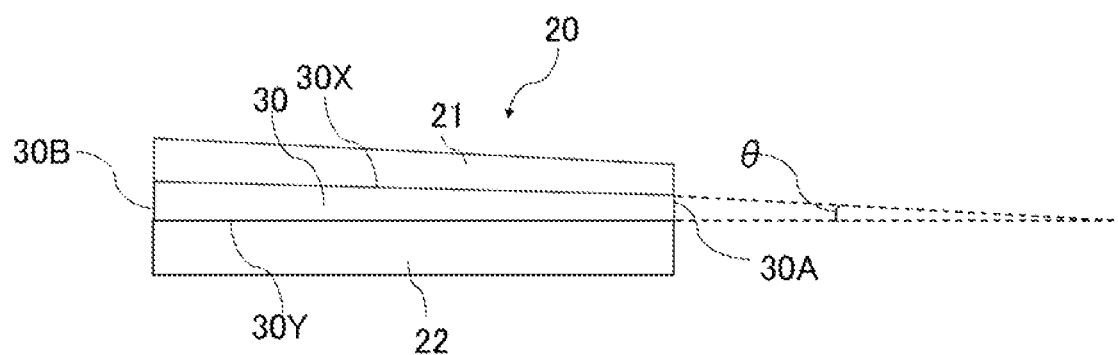
FIG. 4 is a cross-sectional view of a laminated glass having a wedge-shaped interlayer film.
Figure 5:
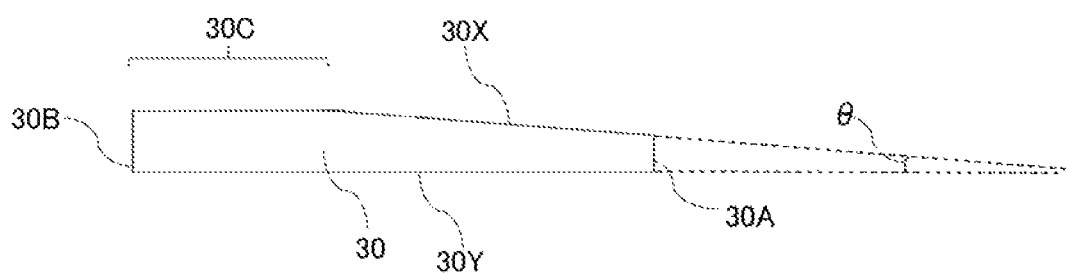
FIG. 5 is a cross-sectional view showing one example of a wedge-shaped interlayer film.
Figure 6:
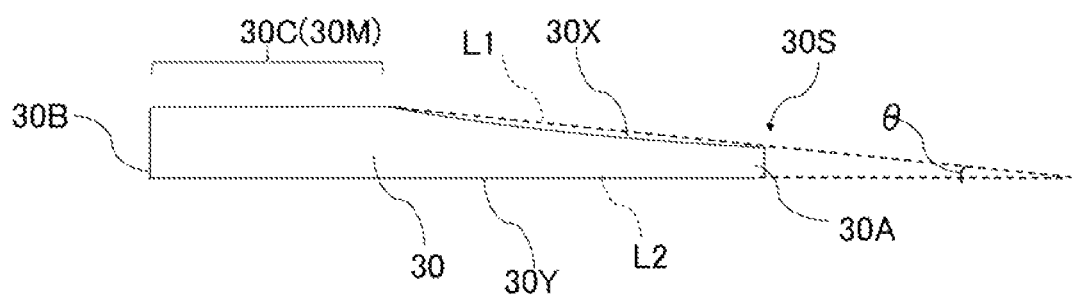
FIG. 6 is a cross-sectional view showing one example of a wedge-shaped interlayer film.

The interlayer film has a rectangular cross section as shown in FIGS. 1 to 3, but the cross-sectional shape is not limited to a rectangular shape, and for example, the interlayer film may have a wedge shape. As shown in FIGS. 4 to 6, the interlayer film 30 having a wedge shape has one end 30A and has the other end 30B on the opposite side to the one end 30A, the thickness of the other end 30B is larger than the thickness of the one end 30A, and the interlayer film 30 has a wedge shape as a whole.

The wedge-shaped interlayer film 30 enables use of the resulting laminated glass 20 for a head-up display system.

The wedge-shaped interlayer film 30 may have, for example, a trapezoidal shape as shown in FIG. 4, but may have a triangular shape. In the wedge-shaped interlayer film 30, the thickness varies from the other end 30A toward the one end 30B, but the thickness does not need to vary in all parts, and as shown in FIG. 5, the interlayer film has a thickness-constant part 30C, and in part of the interlayer film, the thickness may vary.

In FIGS. 4 and 5, the amount of increase in thickness is constant from the one end 30A toward the other end 30B in the part where the thickness varies, but the amount of increase in thickness does not need to be constant, and as shown in FIG. 6, the thickness may gradually vary and become, for example, curved on the cross section.

Regarding the wedge angle θ, when the amount of increase in thickness is constant, the wedge angle is also constant as shown in FIGS. 4 and 5. Accordingly, an inclination angle of the other surface 30X of the interlayer film 30 to one surface 30X thereof becomes the wedge angle θ.

On the other hand, when the amount of increase in thickness varies as shown in FIG. 6, the wedge angle θ is as follows. That is to say, the wedge angle θ is an internal angle at an intersection point of a straight line L1 connecting the nearest sites of the maximum thickness part 30M and the minimum thickness part 30S in the interlayer film 30 on one surface 30X of the interlayer film 30 and a straight line L2 connecting the nearest sites of the maximum thickness part 30M and the minimum thickness part 30S on the other surface 30Y.

The wedge angle θ is preferably 0.1 mrad or more, more preferably 0.2 mrad or more, still more preferably 0.3 mrad or more, and is preferably 1 mrad or less, more preferably 0.9 mrad or less. By setting the wedge angle θ to be in the above range, infrared radiation reflected by the laminated glass is received to easily form an image at one point by the light-receiving unit such as a photographing device.

When the interlayer film is wedge-shaped and has a multilayer structure, the cross-sectional shape of each layer may be appropriately adjusted in such a manner that the interlayer film becomes wedge-shaped, and for example, when a plurality of resin layers is provided as shown in FIGS. 2 and 3, the thickness of at least one resin layer of the plurality of resin layers may be adjusted so as to increase from one end to the other end.

For example, in the case where the interlayer film is wedge-shaped, the optical properties of the laminated glass sometimes vary depending upon the region. In such a case, various optical properties, such as the aforesaid T/R rate, T/R rate (A), T/R rates (1) to (4), T/R rate (B), maximum reflectance, visible light transmittance, Tts, and Tds (1.5), may satisfy the requirements described above in the whole region of the laminated glass, but they may satisfy the above requirements in part of the region. For example, in the case where an infrared monitoring system is introduced, the optical properties may satisfy the above-described requirements in a region where outside light applied to a driver or the like to be monitored is incident, a region where light from a light source is reflected, etc.

(Production Method)

The laminated glass can be produced by, for example, laminating layers (resin layer, infrared reflective layer, etc.) for constituting the interlayer film between two glass plates and thermocompression bonding them.

The resin layer for constituting the interlayer film may be formed by preparing first a resin composition composed of materials for constituting the resin layer such as a thermoplastic resin, and a plasticizer, an infrared absorber and other additives that are added as needed, and forming the composition through extrusion forming, press forming or the like. In the case of a plurality of resin layers, for example, a method including preparing two or more extruders, installing multilayer feed blocks at the tips of the plurality of extruders and performing coextrusion may be adopted. Alternatively, the laminated glass can be produced by arranging an interlayer film of a single-layer or multilayer structure having been formed by extrusion forming such as coextrusion, thermal laminating, press forming or the like between two glass plates and thermocompression bonding them.

[Usage of Laminated Glass]

The laminated glass of the present invention is used as, for example, a window glass, and more specifically, it is preferably used in various vehicles such as automobiles, electric trains, ships and aircrafts, it is more preferably used as a window glass for vehicles such as automobiles and electric trains, and it is still more preferably used as a window glass for an automobile.

(Infrared Monitoring System)

The laminated glass of the present invention is installed as, for example, a window glass in a vehicle loaded with an infrared monitoring system. The system of the whole of a vehicle loaded with an infrared monitoring system refers to a vehicle system. Here, the vehicle is preferably an automobile, and in that case, the vehicle body is an automobile body, and the window glass is a window glass for closing an opening of the automobile body. The laminated glass of the present invention may be any one of a windshield, a side glass, and a rear glass.

The infrared monitoring system (that is, vehicle system) includes a light source and a light-receiving unit, and these light source and light-receiving unit are provided in the interior of the vehicle body. The infrared monitoring system is a system for monitoring occupants, particularly preferably a driver. In the infrared monitoring system, an occupant, preferably a driver (observation object), is irradiated with infrared radiation emitted from a light source arranged in the interior of the vehicle body, the infrared radiation reflected by the observation object is received by the light-receiving unit provided in the interior of the vehicle body, and the state of the occupant (observation object) is detected according to the light received.

Here, the light source is an infrared light source that emits infrared radiation, and the maximum emission wavelength of the light source is preferably 900 to 1300 nm. The infrared radiation of 900 to 1300 nm cannot be recognized with human eyes, but is easily reflected by the human skin or the like, so that the infrared radiation is suitable for monitoring an occupant such as a driver. On the other hand, in the laminated glass, any one of the T/R rate (A), the T/R rates (1) to (4), and the T/R rate (B) is larger than 1, and infrared radiation of 900 to 1300 nm incident from the exterior of the vehicle is sufficiently shielded. On that account, the infrared radiation can be prevented from being incident as noise from the exterior of the vehicle. As described later, when the infrared radiation used for monitoring is reflected, the reflectance to the infrared radiation used for monitoring increases in the laminated glass, so that the accuracy of the monitoring is enhanced, and proper monitoring can be carried out.

In more detail, as previously described, the maximum emission wavelength of the light source is preferably made to exist within a wavelength region where the T/R rates (1) to (4) are each larger than 1, or may be selected in such a manner that the T/R rate (B) becomes larger than 1. The light source is preferably LED. By using LED, the emission wavelength region can be made relatively narrow, and thereby, the accuracy of the monitoring is easily enhanced.

The light-receiving unit used in the vehicle system is preferably a photographing device such as an infrared camera, and by receiving reflected light from the observation object (driver or the like), the observation object is photographed. In the vehicle system, through the image photographed by the photographing device, the state of the observation object may be detected. Specifically, it is preferable to detect the state of the observation object by irradiating the driver's face with infrared radiation and photographing a face image of the driver by the photographing device.

However, the light-receiving unit is not necessarily a photographing device, and it may be a light-receiving sensor for detecting only the intensity of the light received. Even when the light-receiving sensor is used, whether the occupant is seated at the prescribed position (e.g., whether the driver is seated at the driver's seat), etc. can be detected by the intensity of the reflected light.

It is preferable that the vehicle system include a face recognition system, and through the face recognition system, a face be recognized from a face image of the observation object, and from the face recognized, the state of the observation object be detected. More specifically, in the face recognition system, for example, from a face template previously stored and a face image photographed, the positions of eyelids in the face image are detected, and the state of the eyelids is detected, whereby whether the driver is dozing off, etc. can be detected. The face recognition system is constituted of various processors such as DSP and CPU.

In the infrared monitoring system, infrared radiation emitted from the light source is preferably reflected by the laminated glass of the present invention and then applied to the observation object. Further, the reflected light from the observation object is preferably reflected by the laminated glass of the present invention and then received by the light-receiving unit.

When the vehicle is an automobile, it is preferable that at least a windshield be the laminated glass of the present invention, and it is more preferable that all of a windshield, a side glass and a rear glass be the laminated glasses of the present invention.

The infrared monitoring system is preferably used for monitoring a diver. On that account, by using the laminated glass of the present invention as a windshield, infrared radiation contained in the outside light is not easily applied to the driver, and noise is easily reduced. When the windshield is the laminated glass of the present invention, and when the infrared radiation emitted from the light source is reflected by the windshield and applied to the driver or when the reflected light from the driver is reflected by the windshield and received by the light-receiving unit, the reflectance is increased, so that the monitoring can be carried out with high accuracy.

Also, when the windshield is the laminated glass of the present invention and when the reflected light from the driver is reflected by the windshield and received by the light-receiving unit, the reflected light from the front of the face can be received by the light-receiving unit. On that account, it becomes possible to monitor the state of the front of the face, and the monitoring accuracy is further enhanced.

When not only the windshield but also the side glass and the rear glass are all the laminated glasses of the present invention, noise is more easily reduced.

Figure 7:
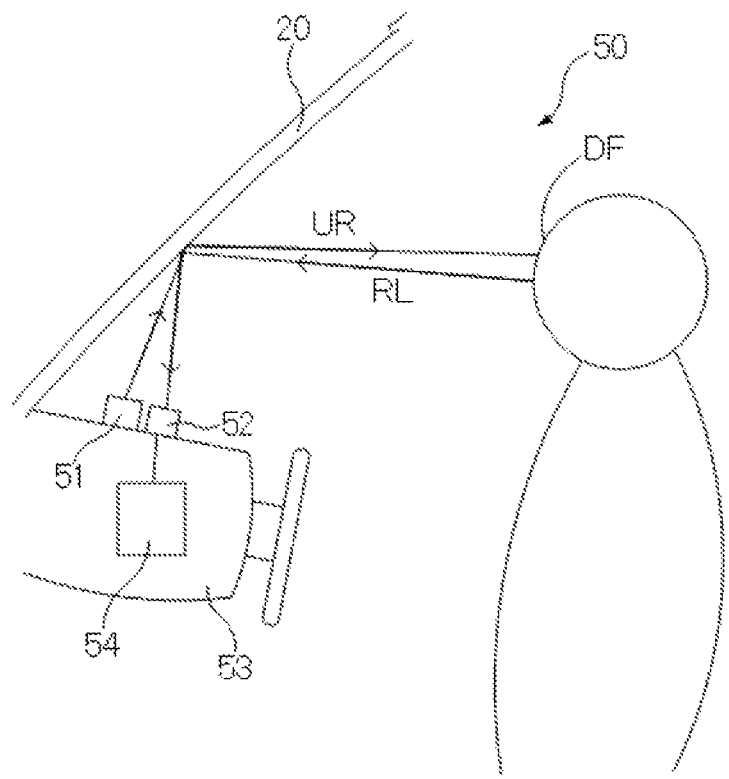
FIG. 7 is a schematic diagram showing one embodiment of a vehicle system having a laminated glass of the present invention.

FIG. 7 shows a vehicle system according to one preferred embodiment. The vehicle system according to one preferred embodiment will be described in detail with reference to FIG. 7. The vehicle system 50 of the present embodiment includes a laminated glass 20, a light source 51 that emits infrared radiation, and a light-receiving unit 52, as shown in FIG. 7.

Here, the vehicle system 50 is a system provided in an automobile, and the laminated glass 20 constitutes a windshield of the automobile. The light-receiving unit 52 is a photographing device constituted of an infrared camera or the like, and the light source 51 and the light-receiving unit 52 are provided on a dashboard 53 of the automobile. The vehicle system 50 further includes a face recognition system 54. The face recognition system 54 is constituted of, for example, processors as previously described. The processors are provided on, for example, the dashboard 53.

In the present embodiment, infrared radiation UR emitted from the light source 51 is reflected by the laminated glass 20 (windshield), and then applied to a driver's face DF. The infrared radiation UR reflected by the driver's face DF becomes reflected light RL, is reflected by the laminated glass 20, and received by the light-receiving unit 52.

Here, the light source 51 is adjusted in such a manner that the infrared radiation UR is applied above the driver's seat, but it may have a constitution such that the emission direction and the emission position can be changed so that the infrared radiation UR can be certainly applied to the driver's face DF. Likewise, the light-receiving unit 52 is adjusted in such a manner that an image above the driver's seat can be photographed, but similarly to the light source 51, it may have a constitution such that the light-receiving position and the light-receiving direction can be appropriately adjusted.

The light-receiving unit 52 is a photographing device as described above, and therefore, a driver's face is photographed, then the driver's face is recognized based on the photographed face image in the face recognition system 54, and for example, whether the eyelids are closed is detected.

The optical path centers of the infrared radiation UR and the reflected light RL are each preferably inclined against the surface of the laminated glass 20 (surface of the second glass plate) and made incident thereon. The incident angle is not particularly limited, but is, for example, 20 to 80°, and preferably 40 to 70°.

According to the vehicle system of the present embodiment, use of the laminated glass of the present invention as a windshield makes it possible to properly carrying out monitoring of a driver as described above. An automobile further has a side glass and a rear glass, and these side glass and rear glass are also each preferably constituted of the laminated glass of the present invention in order that the vehicle system of the present embodiment may carry out monitoring of higher accuracy.

The vehicle system of the present embodiment described above is an example of a vehicle system, and various modification can be made as long as the effects of the present invention are exerted.

EXAMPLES

The present invention will be described in more detail with reference to Examples, but the present invention is in no way limited to these Examples.

In the present invention, measuring methods for various properties and evaluation methods for laminated glasses are as follows.

(Visible Light Transmittance (Tv))

A visible light transmittance (Tv) of a laminated glass was measured using a spectrophotometer ("U-4100" manufactured by Hitachi High-Technologies Corporation) in accordance with JIS R3212 (2015). In the measurement, the laminated glass was set at a distance of 13 cm from an integrating sphere in such a manner that the laminated glass was on an optical path between the light source and the integrating sphere and became parallel to a normal of an optical axis so that only a parallel light transmitted through the laminated glass might be received by the integrating sphere, and a spectral transmittance was measured. From the resulting spectral transmittance, a visible light transmittance was calculated. The measurement was carried out under the measuring conditions of a scan speed of 300 nm/min and a slit width of 8 nm and under other conditions based on JIS R 3212 (2015).

(Tds (1.5))

A solar transmittance Tds (1.5) of a laminated glass was measured using a spectrophotometer ("U-4100" manufactured by Hitachi High-Technologies Corporation) in accordance with ISO 13837 (2008). In the measurement, the laminated glass was set at a distance of 13 cm from an integrating sphere in such a manner that the laminated glass was on an optical path between the light source and the integrating sphere and became parallel to a normal of an optical axis so that only a parallel light transmitted through the laminated glass might be received by the integrating sphere, and a spectral transmittance was measured. From the resulting spectral transmittance, a solar transmittance Tds (1.5) of the laminated glass at a wavelength of 300 to 2500 nm was calculated. The measurement was carried out under the measuring conditions of a scan speed of 300 nm/min and a slit width of 8 nm and under other conditions based on ISO 13837 (2008).

(Tts)

Transmittance/reflectance at a wavelength of 300 to 2500 nm was measured using a spectrophotometer ("U-4100" manufactured by Hitachi High-Tech Corporation) in accordance with ISO 13837 (2008), and Tts was calculated. The measurement was carried out under the measuring conditions of a scan speed of 300 nm/min and a slit width of 8 nm and under other conditions based on ISO 13837 (2008).

(Average Transmittance T)

A 0° transmittance at 900 to 1300 nm was measured by the same measuring method as for the visible light transmittance. An average value of transmittances in the wavelength regions was determined. The transmittance data measurement interval was set to 5 nm.

(Maximum Reflectance R)

An infrared reflectance at an incident angle of 60° was measured. Specifically, an absolute reflectance measuring unit ("ARSN-733" manufactured by JASCO Corporation) was installed on a spectrophotometer ("V-670" manufactured by JASCO Corporation), and the incident angle from the light source was adjusted to 60° to carry out measurement. The measurement was carried out under the measuring conditions of a band width of 20 nm at a wavelength of 850 nm or more and a band width of 2.0 nm at a wavelength of less than 850 nm. The data measurement interval was set to 5 nm. Among the measured reflectances, the reflectance that was maximum in each wavelength region was regarded as a maximum reflectance.

(Infrared Camera Observation Test)

Figure 8:
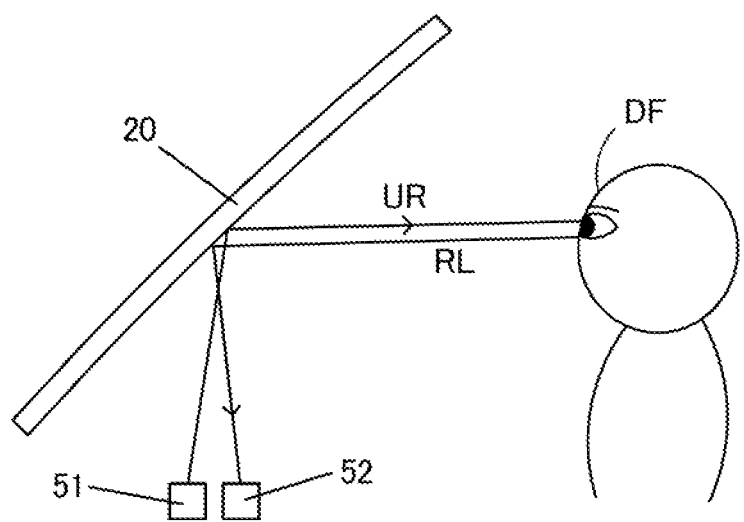
FIG. 8 is a schematic diagram for explaining an infrared camera observation test.

As shown in FIG. 8, a virtual infrared monitoring system was fabricated. Specifically, a laminated glass 20 obtained in each of Examples and Comparative Examples was prepared and arranged by inclining the glass at 45° to the horizontal direction. A test subject assumed to be a driver was arranged in such a manner that the test subject directly faced the laminated glass.

As the light source 51, an LED light was prepared, and as the light-receiving unit 52, an infrared camera was prepared. These were arranged below the laminated glass 20, and the laminated glass 20 was irradiated with infrared radiation in such a manner that the incident angle on the glass from the light source 51 became 60°, and the infrared radiation was reflected by the laminated glass 20 and applied to the test subject's face DF. The reflected light from the test subject's face DF was received by the infrared camera to shoot a video. The resulting shot video was observed by 10 panelists, and evaluated based on the following evaluation criteria.

A: All the panelists were able to confirm movement of eyelids of the test subject's face.

B: 80% or more and less than 100% of the panelists were able to confirm movement of eyelids of the test subject's face.

C: 50% or more and less than 80% of the panelists were able to confirm movement of eyelids of the test subject's face.

D: 50% or more and less than 80% of the panelists were able to confirm movement of eyelids of the test subject's face.

E: Only less than 50% of the panelists were able to confirm movement of eyelids of the test subject's face.

In the infrared camera observation test, LED light-emitting elements having maximum emission wavelengths of about 950 nm, about 1050 nm, about 1150 nm and about 1250 nm were prepared, and a plurality of light sources constituted of an LED light-emitting element was used. As light sources, a light source constituted of a light-emitting element having a maximum emission wavelength of about 950 nm, a light source constituted of a light-emitting element having a maximum emission wavelength of about 1050 nm, a light source constituted of a light-emitting element having a maximum emission wavelength of about 1150 nm, and a light source constituted of a light-emitting element having a maximum emission wavelength of about 1250 nm were prepared. Moreover, a composite light source having all the LED light-emitting elements having maximum emission wavelengths of about 950 nm, about 1050 nm, about 1150 nm and about 1250 nm was prepared, and using each light source, evaluation was carried out.

(Evaluation of Electromagnetic Wave Transmission Property at Frequency of 0.1 to 26.5 GHz)

A reflection loss value (dB) of a laminated glass in the range of 0.1 to 2 GHz was compared with that of a usual float glass single plate having a plate thickness of 2.5 mm by KEC method measurement (measurement of near field electromagnetic wave shielding effect), and a case where the average value of differences at the above frequencies was less than 10 dB was written as "A", and a case where the average value thereof was 10 dB or more was written as "B". Regarding a reflection loss value (dB) in the range of 2 to 26.5 GHz, a sample of 600 mm square was stood up between a pair of antennas for transmitting and receiving, and radio waves from a radio signal generator were received by a spectrum analyzer, and transmission property of the sample was evaluated (far field electromagnetic wave measuring method).

In Examples and Comparative Examples, the following components and materials were used.

(Glass Plate)

Clear glass: glass having a thickness of 2.5 mm, a visible light transmittance of 90%, a solar transmittance Tds (1.5) of 87%, and a transmittance of 84% at 900 to 1300 nm, not containing an absorber having a peak at 900 to 1300 nm, having a reflectance of 7% at 900 to 1300 nm at an incident angle of 0°, and having other items conforming to JIS R3202-2011.

Green glass: glass having a thickness of 2.1 mm, a visible light transmittance of 86%, a solar transmittance Tds (1.5) of 72%, and a transmittance of 56% at 900 to 1300 nm, not containing an absorber having a peak at 900 to 1300 nm, having a reflectance of 6% at 900 to 1300 nm at an incident angle of 0°, and having other items conforming to JIS R3202-2011.

(Resin)

Polyvinyl butyral: polyvinyl butyral resin, degree of acetalization: 69 mol %, amount of hydroxyl group: 30 mol %, degree of acetylation: 1 mol %, degree of polymerization: 1700

(Plasticizer)

Plasticizer: triethylene glycol di-2-ethylhexanoate (Heat-Shielding Particles)

ITO: tin-doped indium oxide particles (ITO particles), average particle diameter: 35 nm CWO: cesium-doped tungsten oxide particles (CWO particles), average particle diameter: 50 nm (Organic Dye)

IR-915: manufactured by NIPPON SHOKUBAI CO., LTD., phthalocyanine compound, trade name "TIR-915"

TX-EX-902K: manufactured by NIPPON SHOKUBAI CO., LTD., phthalocyanine compound, trade name "TX-EX-902K"

IR-14: manufactured by NIPPON SHOKUBAI CO., LTD., phthalocyanine compound, trade name "IR-14"

(Infrared Reflective Layer)

3M90S: Nano90S (3M, multilayer resin film, "Multilayer Nano 90S" manufactured by Sumitomo 3M Limited)

XIR: XIR-75 (resin film with metal foil, "XIR-75" manufactured by Southwall Technologies Inc.)

Heat-shielding film: "SpG 60" manufactured by NEXFIL Co., Ltd.

Example 1

(Preparation of First Resin Layer)

A polyvinyl butyral resin, a plasticizer, heat-shielding particles and an organic dye were mixed in accordance with the formulation shown in Table 1, and the resulting thermoplastic resin composition was subjected to extrusion forming by a twin-screw anisotropic extruder, thereby preparing a first resin layer having a thickness of 380 μm. When the components were mixed, the organic dye was dispersed in the plasticizer in advance and then mixed.

(Preparation of Second Resin Layer)

A second resin layer was prepared in the same manner as for the first resin layer, except that the formulation was changed according to the description in Table 1.

(Preparation of Laminated Glass)

A first glass, the first resin layer, the second resin layer, and a second glass were laminated in this order, and they were temporarily pressure bonded by a vacuum bag method. The laminate obtained by the temporary pressure bonding was kept in an autoclave for 10 minutes under the conditions of a temperature of 140° C. and a pressure of 1.3 MPa, and then the temperature was decreased down to 50° C. and the pressure was returned to atmospheric pressure to complete final pressure bonding, thereby obtaining a laminated glass. The laminated glass had a layer constitution of first glass plate/first resin layer (absorber-containing layer)/second resin layer/second glass plate.

Examples 2 to 19, Comparative Example 7

Examples 2 to 19 and Comparative Example 7 were each carried out in the same manner as in Example 1, except that an infrared reflective layer was provided between the first resin layer and the second resin layer, the formulation of the first and second resin layers was changed as described in Tables 1 and 2, and the glasses described in Tables 1 and 2 were used as the first and second glasses.

In Examples 2 to 21, in the preparation of the laminated glass, the first glass, the first resin layer, the infrared reflective layer, the second resin layer and the second glass were laminated in this order, whereby the resulting laminated glass had a layer constitution of first glass plate/first resin layer/infrared reflective layer/second resin layer/second glass plate.

Example 20

An infrared reflective layer was arranged between a first resin layer and a second resin layer, and they were thermally laminated in such a manner that the resulting laminate had a wedge shape of isosceles trapezoid, thereby preparing an interlayer film. The first resin layer and the second resin layer were formed symmetrically about the infrared reflective layer so that the thicknesses of them might become equal to each other at each position. The resulting interlayer film had a maximum thickness of 1160 μm, a minimum thickness of 760 μm, and a wedge angle of 0.4 mrad. The thickness of the interlayer film gradually increased from the other end to one end, and the length from the other end to one end was 1 m. The formulation of the first resin layer and the second resin layer, and the infrared reflective layer are as shown in Table 2.

A first glass, the interlayer film, and a second glass were laminated in this order, and they were temporarily pressure bonded by a vacuum bag method. The laminate obtained by the temporary pressure bonding was subjected to final pressure bonding in the same manner as in Example 1, thereby obtaining a laminated glass.

Measurement of optical properties of the laminated glass were carried out at the position of 30 cm from the other end of the interlayer film, and the thickness at that position was 880 μm.

Comparative Examples 1 to 6

Comparative Examples 1 to 6 were each carried out in the same manner as in Example 1, except that the formulation of the first and second resin layers was changed as described in Table 2, and the glasses described in Table 2 were used as the first and second glasses.

TABLE 1

|  |  |  |  | Example | | |
|---|---|---|---|---|---|---|
|  |  |  | Unit | 1 | 2 | 3 |
| First glass plate |  | Glass type |  | Green | Clear | Clear |
| First resin layer | Thickness |  | mm | 0.38 | 0.38 | 0.38 |
| (vehicle exterior side) | Polyvinyl butyral |  | part(s) by mass | 100 | 100 | 100 |
|  | Plasticizer |  | part(s) by mass | 40 | 40 | 40 |
|  | Heat-shielding particle | ITO | wt % |  |  |  |
|  |  | CWO | wt % | 0.10 |  |  |
|  | Organic dye | IR-915 | wt % | 0.02 | 0.02 |  |
|  |  | TX-EX-902K | wt % | 0.02 |  | 0.02 |
|  |  | IR-14 | wt % |  |  |  |
| Infrared reflective layer | — | Type |  | None | XIR | XIR |
| Second resin layer | Thickness |  | mm | 0.38 | 0.38 | 0.38 |
| (vehicle interior side) | Polyvinyl butyral |  | part(s) by mass | 100 | 100 | 100 |
|  | Plasticizer |  | part(s) by mass | 40 | 40 | 40 |
|  | Heat-shielding particle | ITO | wt % |  |  |  |
|  |  | CWO | wt % |  |  |  |
|  | Organic dye | IR-915 | wt % |  |  |  |
|  |  | TX-EX-902K | wt % |  |  |  |
|  |  | IR-14 | wt % |  |  |  |
| Second glass plate |  | Glass type |  | Green | Clear | Clear |
| Optical properties | Transmittance |  | Tv | % | 63.1 | 71.2 | 72.5 |
|  |  |  | Tds (1.5) | % | 32.9 | 39.0 | 39.6 |
|  |  |  | Tts | % | 51.2 | 51.3 | 51.8 |

TABLE 1-continued

|  |  |  |  |  |  |  |
|---|---|---|---|---|---|---|
|  | Average transmittance T | TA: 900-1300 nm | % | 11.5 | 12.2 | 12.0 |
|  |  | T1: 900-1000 nm | % | 6.4 | 14.1 | 16.8 |
|  |  | T2: 1000-1100 nm | % | 9.5 | 14.6 | 10.6 |
|  |  | T3: 1100-1200 nm | % | 14.4 | 11.7 | 10.6 |
|  |  | T4: 1200-1300 nm | % | 15.6 | 8.5 | 8.4 |
|  | 60° maximum reflectance R | RA: 900-1300 nm | % | 11.5 | 64.3 | 64.3 |
|  |  | R1: 900-1000 nm | % | 11.5 | 54.2 | 54.2 |
|  |  | R2: 1000-1100 nm | % | 10.2 | 58.2 | 58.2 |
|  |  | R3: 1100-1200 nm | % | 10.1 | 59.8 | 59.8 |
|  |  | R4: 1200-1300 nm | % | 10.4 | 64.3 | 64.3 |
|  | T/R rate, LogT/100 + LogR/100 | T/R rate (A): 900-1300 nm |  | 1.00 | 4.76 | 4.80 |
|  |  | T/R rate (1): 900-1000 nm |  | 1.27 | 3.20 | 2.92 |
|  |  | T/R rate (2): 1000-1100 nm |  | 1.03 | 3.55 | 4.14 |
|  |  | T/R rate (3): 1100-1200 nm |  | 0.84 | 4.17 | 4.36 |
|  |  | T/R rate (4): 1200-1300 nm |  | 0.82 | 5.57 | 5.61 |
| IR camera observation | LED light wavelength | Composite (950/1050/1150/1250 nm) |  | E | B | B |
|  |  | 950 nm |  | D | C | C |
|  |  | 1050 nm |  | D | C | B |
|  |  | 1150 nm |  | E | B | B |
|  |  | 1250 nm |  | E | B | B |
| Electromagnetic wave transmission property |  |  |  | A | B | B |

| | | Example | | | | | |
|---|---|---|---|---|---|---|---|
| | | 4 | 5 | 6 | 7 | 8 | 9 |
| First glass plate | | Clear | Clear | Clear | Green | Green | Green |
| First resin layer (vehicle exterior side) | | 0.38 | 0.38 | 0.38 | 0.38 | 0.38 | 0.38 |
| | | 100 | 100 | 100 | 100 | 100 | 100 |
| | | 40 | 40 | 40 | 40 | 40 | 40 |
| | | 0.02 | 0.10 | 0.10 | | | 0.04 |
| | | 0.02 | | 0.02 | 0.02 | | |
| | | | | | | 0.02 | 0.02 |
| Infrared reflective layer | | XIR | 3M90S | 3M90S | 3M90S | 3M90S | 3M90S |
| Second resin layer (vehicle interior side) | | 0.38 | 0.38 | 0.38 | 0.38 | 0.38 | 0.38 |
| | | 100 | 100 | 100 | 100 | 100 | 100 |
| | | 40 | 40 | 40 | 40 | 40 | 40 |
| Second glass plate | | Clear | Clear | Clear | Green | Green | Green |
| Optical properties | | 70.5 | 83.1 | 75.9 | 70.2 | 71.5 | 70.1 |
| | | 37.5 | 47.1 | 42.7 | 40.8 | 41.4 | 37.6 |
| | | 50.3 | 57.5 | 54.6 | 54.6 | 55.1 | 52.6 |
| | | 10.6 | 12.7 | 12.0 | 11.6 | 11.3 | 8.3 |
| | | 12.4 | 7.7 | 4.6 | 3.9 | 4.0 | 3.1 |
| | | 12.7 | 6.2 | 4.9 | 4.1 | 3.0 | 2.3 |
| | | 10.1 | 7.3 | 7.5 | 6.8 | 6.5 | 4.8 |
| | | 7.3 | 26.8 | 27.6 | 27.7 | 27.3 | 19.9 |
| | | 64.3 | 78.7 | 78.7 | 22.7 | 22.7 | 22.7 |
| | | 54.2 | 78.7 | 78.7 | 22.7 | 22.7 | 22.7 |
| | | 58.2 | 54.7 | 54.7 | 17.3 | 17.3 | 17.3 |
| | | 59.8 | 11.3 | 11.3 | 9.9 | 9.9 | 9.9 |
| | | 64.3 | 10.7 | 10.7 | 10.0 | 10.0 | 10.0 |
| | | 5.08 | 8.62 | 8.88 | 1.45 | 1.47 | 1.68 |
| | | 3.41 | 10.72 | 12.86 | 2.19 | 2.17 | 2.34 |
| | | 3.81 | 4.61 | 5.01 | 1.83 | 2.00 | 2.15 |
| | | 4.45 | 1.20 | 1.18 | 1.16 | 1.18 | 1.31 |
| | | 5.92 | 0.59 | 0.58 | 0.56 | 0.56 | 0.70 |
| IR camera observation | | B | A | A | D | D | D |
| | | C | A | A | D | D | C |
| | | B | B | B | D | D | D |
| | | B | D | D | D | D | D |
| | | B | E | E | E | E | E |
| Electromagnetic wave transmission property | | B | A | A | A | A | A |

TABLE 1-continued

| | | Example | | | | |
|---|---|---|---|---|---|---|
| | | 10 | 11 | 12 | 13 | 14 |
| First glass plate | | Clear | Clear | Clear | Clear | Green |
| First resin layer (vehicle exterior side) | | 0.38 | 0.38 | 0.38 | 0.38 | 0.38 |
| | | 100 | 100 | 100 | 100 | 100 |
| | | 40 | 40 | 40 | 40 | 40 |
| Infrared reflective layer | | XIR | 3M90S | 3M90S | 3M90S | 3M90S |
| Second resin layer (vehicle interior side) | | 0.38 | 0.38 | 0.38 | 0.38 | 0.38 |
| | | 100 | 100 | 100 | 100 | 100 |
| | | 40 | 40 | 40 | 40 | 40 |
| | | | 0.40 | | | 0.40 |
| | | 0.05 | | 0.05 | 0.05 | |
| | | 0.04 | | | 0.04 | |
| Second glass plate | | Clear | Clear | Clear | Clear | Green |
| Optical properties | | 65.9 | 86.0 | 85.1 | 73.8 | 75.7 |
| | | 32.9 | 51.2 | 53.2 | 45.4 | 38.2 |
| | | 49.2 | 61.6 | 63.4 | 58.9 | 54.7 |
| | | 6.7 | 17.4 | 18.6 | 16.2 | 7.8 |
| | | 8.3 | 13.7 | 10.7 | 4.2 | 6.0 |
| | | 5.0 | 10.7 | 8.7 | 3.1 | 4.5 |
| | | 6.9 | 10.7 | 10.6 | 10.2 | 4.6 |
| | | 5.7 | 32.8 | 39.8 | 40.7 | 14.9 |
| | | 34.7 | 70.5 | 45.8 | 21.9 | 21.3 |
| | | 16.4 | 70.5 | 45.8 | 21.9 | 21.3 |
| | | 22.0 | 46.0 | 32.9 | 11.9 | 15.9 |
| | | 32.1 | 10.7 | 10.4 | 10.0 | 9.9 |
| | | 34.7 | 10.1 | 10.2 | 10.2 | 9.9 |
| | | 2.55 | 5.00 | 2.15 | 1.20 | 1.65 |
| | | 1.38 | 5.70 | 2.85 | 2.10 | 1.82 |
| | | 1.98 | 2.88 | 2.20 | 1.63 | 1.68 |
| | | 2.35 | 1.00 | 0.99 | 0.99 | 1.33 |
| | | 2.70 | 0.49 | 0.40 | 0.39 | 0.82 |
| IR camera observation | | C | B | D | D | D |
| | | D | B | C | D | D |
| | | D | C | D | D | D |
| | | D | E | E | E | D |
| | | C | E | E | E | E |
| Electromagnetic wave transmission property | | B | A | A | A | A |

TABLE 2

| | | | Example | | | | |
|---|---|---|---|---|---|---|---|
| | | Unit | 15 | 16 | 17 | 18 | 19 |
| First glass plate | | Glass type | Green | Green | Clear | Clear | Green |
| First resin layer (vehicle exterior side) | Thickness | mm | 0.38 | 0.38 | 0.38 | 0.38 | 0.38 |
| | Polyvinyl butyral | part(s) by mass | 100 | 100 | 100 | 100 | 100 |
| | Plasticizer | part(s) by mass | 40 | 40 | 40 | 40 | 40 |
| | Heat-shielding particle | ITO | wt % | | | | | |
| | | CWO | wt % | | | | 0.10 | 0.04 |
| | Organic dye | IR-915 | wt % | | | 0.02 | 0.02 | |
| | | TX-EX-902K | wt % | | | | | 0.02 |
| | | IR-14 | wt % | | | | | |
| Infrared reflective layer | — | Type | 3M90S | 3M90S | XIR | 3M90S | 3M90S |
| Second resin layer (vehicle interior side) | Thickness | mm | 0.38 | 0.38 | 0.38 | 0.38 | 0.38 |
| | Polyvinyl butyral | part(s) by mass | 100 | 100 | 100 | 100 | 100 |
| | Plasticizer | part(s) by mass | 40 | 40 | 40 | 40 | 40 |
| | Heat-shielding particle | ITO | wt % | | | 0.40 | 0.80 | 0.40 |
| | | CWO | wt % | 0.03 | 0.03 | | | |
| | Organic dye | IR-915 | wt % | | | | | |
| | | TX-EX-902K | wt % | | 0.02 | | | |
| | | IR-14 | wt % | | 0.02 | | | |

TABLE 2-continued

| Second glass plate Optical properties | | Glass type | | Green | Green | Clear | Clear | Green |
|---|---|---|---|---|---|---|---|---|
| | Transmittance | Tv | % | 75.6 | 65.3 | 70.2 | 73.8 | 69.2 |
| | | Tds (1.5) | % | 41.5 | 34.4 | 37.1 | 36.2 | 32.8 |
| | | Tts | % | 56.7 | 51.7 | 51.1 | 51.2 | 50.8 |
| | Average transmittance T | TA: 900-1300 nm | % | 9.7 | 9.2 | 9.8 | 5.0 | 5.1 |
| | | T1: 900-1000 nm | % | 5.3 | 3.4 | 13.1 | 3.9 | 2.8 |
| | | T2: 1000-1100 nm | % | 4.2 | 2.6 | 12.5 | 3.7 | 2.0 |
| | | T3: 1100-1200 nm | % | 5.3 | 5.3 | 8.7 | 3.7 | 3.3 |
| | | T4: 1200-1300 nm | % | 21.2 | 22.1 | 5.0 | 8.6 | 11.0 |
| | 60° maximum reflectance R | RA: 900-1300 nm | % | 18.6 | 14.9 | 45.5 | 64.1 | 21.3 |
| | | R1: 900-1000 nm | % | 18.6 | 14.9 | 45.5 | 64.1 | 21.3 |
| | | R2: 1000-1100 nm | % | 14.9 | 11.5 | 44.9 | 39.1 | 15.9 |
| | | R3: 1100-1200 nm | % | 9.9 | 9.9 | 41.2 | 10.3 | 9.9 |
| | | R4: 1200-1300 nm | % | 10.0 | 10.0 | 30.1 | 10.0 | 9.9 |
| | T/R rate, | T/R rate (A): 900-1300 nm | | 1.38 | 1.25 | 2.96 | 6.77 | 1.92 |
| | LogT/100 + | T/R rate (1): 900-1000 nm | | 1.74 | 1.78 | 2.59 | 7.33 | 2.30 |
| | Log R/100 | T/R rate (2): 1000-1100 nm | | 1.67 | 1.70 | 2.60 | 3.50 | 2.13 |
| | | T/R rate (3): 1100-1200 nm | | 1.27 | 1.27 | 2.76 | 1.45 | 1.47 |
| | | T/R rate (4): 1200-1300 nm | | 0.67 | 0.65 | 2.50 | 1.06 | 0.96 |
| IR camera observation | LED light wavelength | Composite (950/1050/1150/1250 nm) | | D | D | C | B | D |
| | | 950 nm | | D | D | C | B | D |
| | | 1050 nm | | D | D | C | C | D |
| | | 1150 nm | | D | D | C | D | D |
| | | 1250 nm | | E | E | C | D | E |
| Electromagnetic wave transmission property | | | | A | A | B | A | A |

| | Example | Comparative Example | | | | | | |
|---|---|---|---|---|---|---|---|---|
| | 20 | 1 | 2 | 3 | 4 | 5 | 6 | 7 |
| First glass plate | Clear | Green | Green | Green | Clear | Clear | Green | Clear |
| First resin layer (vehicle exterior side) | Wedge | 0.38 | 0.38 | 0.38 | 0.38 | 0.38 | 0.38 | 0.38 |
| | 100 | 100 | 100 | 100 | 100 | 100 | 100 | 100 |
| | 40 | 40 | 40 | 40 | 40 | 40 | 40 | 40 |
| | 0.10 | | 0.10 | 0.04 | | 0.16 | | |
| | 0.02 | | | | | | | |
| | | | | 0.02 | 0.04 | | | |
| Infrared reflective layer | 3M90S | None | None | None | None | None | None | SpG60 |
| Second resin layer (vehicle interior side) | Wedge | 0.38 | 0.38 | 0.38 | 0.38 | 0.38 | 0.38 | 0.38 |
| | 100 | 100 | 100 | 100 | 100 | 100 | 100 | 100 |
| | 40 | 40 | 40 | 40 | 40 | 40 | 40 | 40 |
| | | | | | | | 0.06 | 0.05 |
| | | | | | 0.02 | | | |
| | | | | | | | | 0.00 |
| Second glass plate | Clear | Green | Green | Green | Clear | Clear | Green | Clear |
| Optical properties | 75.2 | 77.7 | 74.0 | 71.0 | 88.3 | 70.9 | 69.0 | 62.0 |
| | 42.2 | 51.6 | 39.8 | 41.8 | 75.9 | 38.7 | 39.4 | 40.6 |
| | 54.0 | 64.3 | 56.4 | 57.5 | 80.6 | 55.5 | 55.6 | 54.0 |
| | 11.8 | 32.4 | 15.9 | 20.0 | 74.0 | 16.3 | 18.2 | 23.2 |
| | 4.5 | 33.2 | 17.2 | 16.8 | 75.3 | 11.7 | 12.6 | 25.1 |
| | 4.8 | 31.5 | 15.9 | 15.7 | 74.6 | 11.1 | 18.7 | 24.1 |
| | 7.4 | 30.8 | 15.0 | 21.7 | 72.2 | 20.2 | 20.5 | 22.9 |
| | 27.3 | 32.9 | 15.0 | 24.3 | 72.8 | 21.2 | 21.1 | 21.0 |
| | 78.5 | 11.5 | 11.5 | 11.5 | 11.5 | 11.5 | 10.5 | 19.4 |
| | 78.6 | 11.5 | 11.5 | 11.5 | 11.5 | 11.5 | 10.5 | 13.3 |
| | 54.6 | 10.2 | 10.2 | 10.2 | 10.2 | 10.2 | 10.2 | 13.1 |
| | 11.2 | 10.1 | 10.1 | 10.1 | 10.1 | 10.1 | 9.9 | 13.7 |
| | 10.5 | 10.4 | 10.4 | 10.4 | 10.4 | 10.4 | 9.9 | 19.4 |
| | 8.83 | 0.52 | 0.85 | 0.74 | 0.14 | 0.84 | 0.8 | 0.89 |
| | 12.88 | 0.51 | 0.81 | 0.82 | 0.13 | 0.99 | 0.9 | 0.69 |
| | 5.02 | 0.51 | 0.81 | 0.81 | 0.13 | 0.96 | 0.7 | 0.70 |
| | 1.19 | 0.51 | 0.83 | 0.67 | 0.14 | 0.70 | 0.7 | 0.74 |
| | 0.58 | 0.49 | 0.84 | 0.63 | 0.14 | 0.68 | 0.7 | 0.95 |

TABLE 2-continued

| | | | | | | | | |
|---|---|---|---|---|---|---|---|---|
| IR camera observation | A | E | E | E | E | E | E | E |
| | A | E | E | E | E | E | E | E |
| | B | E | E | E | E | E | E | E |
| | D | E | E | E | E | E | E | E |
| | E | E | E | E | E | E | E | E |
| Electromagnetic wave transmission property | A | A | A | A | A | A | A | A |

* In Tables 1 and 2, the amounts of polyvinyl butyral and the plasticizer are expressed in part(s) by mass, and the amounts of the heat-shielding particles and the organic dye are expressed in mass % based on the total amount of each resin layer.

As shown in the above examples, when the T/R rate calculated from the average transmittance T and the maximum reflectance R in each wavelength region was larger than 1 and when infrared monitoring was carried out using a light source having a maximum emission wavelength in that a wavelength region, the monitoring was able to be properly carried out.

On the other hand, as shown in Comparative Examples, when the T/R rate calculated from the average transmittance T and the maximum reflectance R in each wavelength region was 1 or less and when infrared monitoring was carried out using a light source having a maximum emission wavelength in that a wavelength region, the monitoring was not able to be properly carried out.

REFERENCE SIGNS LIST 10, 30: interlayer film
20: laminated glass
11: resin layer (absorber-containing layer)
11A: first resin layer
11B: second resin layer
13: infrared reflective layer
21: first glass plate
22: second glass plate
50: vehicle system
51: light source
52: light-receiving unit
54: face recognition system

The invention claimed is:

1. A laminated glass having a T/R rate (A) of larger than 1, the T/R rate (A) being calculated from the following formula (1):

$$T/R \text{ rate } (A) = \log 10(TA/100)/\log 10(RA/100) \quad (1)$$

wherein TA represents an average transmittance at a wavelength of 900 to 1300 nm through one face, and RA represents a maximum reflectance at a wavelength of 900 to 1300 nm at an incident angle of 60° on the other face,
the laminated glass comprises a first glass plate, a second glass plate and an interlayer film arranged between the first glass plate and the second glass plate,
the interlayer film comprises a first resin layer arranged on a vehicle exterior side, a second resin layer arranged on a vehicle interior side, and an infrared reflective layer provided between the first resin layer and the second resin layer,
the first resin layer comprises a first infrared absorber having a maximum absorption wavelength peak ranging from 900 to 1300 nm, and
the infrared reflective layer is a resin film with a metal foil.

2. The laminated glass according to claim 1, wherein the infrared absorber comprises heat-shielding particles.

3. A vehicle system comprising
the laminated glass according to claim 1 provided in a vehicle body,
a light source provided in the interior of the vehicle body and emitting infrared radiation, and
a light-receiving unit provided in the interior of the vehicle body and receiving a reflected light from an observation object having been irradiated with the infrared radiation; and
detecting a state of the observation object by the reflected light received by the light-receiving unit.

4. The vehicle system according to claim 3, wherein the vehicle is an automobile, and the laminated glass constitutes any one of a windshield, a side glass, and a rear glass.

5. The vehicle system according to claim 4, wherein the laminated glass constitutes the windshield.

6. The vehicle system according to claim 3, further comprising a face recognition system for recognizing a face of the observation object by the reflected light received.

7. The vehicle system according to claim 3, wherein the reflected light from the observation object is received by the light-receiving unit through reflection by the laminated glass.

8. A laminated glass having a T/R rate (1) of larger than 1, the T/R rate (1) being calculated from the following formula (2-1):

$$T/R \text{ rate } (1) = \log 10(T1/100)/\log 10(R1/100) \quad (2\text{-}1)$$

wherein T1 represents an average transmittance at a wavelength of 900 to 1000 nm through one face, and R1 represents a maximum reflectance at a wavelength of 900 to 1000 nm at an incident angle of 60° on the other face,
the laminated glass comprises a first glass plate, a second glass plate and an interlayer film arranged between the first glass plate and the second glass plate,
the interlayer film comprises a first resin layer arranged on a vehicle exterior side, a second resin layer arranged on a vehicle interior side, and an infrared reflective layer provided between the first resin layer and the second resin layer,
the first resin layer comprises a first infrared absorber having a maximum absorption wavelength peak ranging from 900 to 1300 nm, and
the infrared reflective layer is a resin film with a metal foil.

9. A laminated glass having a T/R rate (2) of larger than 1, the T/R rate (2) being calculated from the following (2-2):

$$T/R \text{ rate } (2) = \log 10(T2/100)/\log 10(R2/100) \quad (2\text{-}2)$$

wherein T2 represents an average transmittance at a wavelength of 1000 to 1100 nm through one face, and R2 represents a maximum reflectance at a wavelength of 1000 to 1100 nm at an incident angle of 60° on the other face, the laminated glass comprises a first glass plate, a second glass plate and an interlayer film arranged between the first glass plate and the second glass plate, the interlayer film comprises a first resin layer arranged on a vehicle exterior side, a second resin layer arranged on a vehicle interior side, and an infrared reflective layer provided between the first resin layer and the second resin layer, the first resin layer comprises a first infrared absorber having a maximum absorption wavelength peak ranging from 900 to 1300 nm, and the infrared reflective layer is a resin film with a metal foil.

10. A laminated glass having a T/R rate (3) of larger than 1, the T/R rate (3) being calculated from the following formula (2-3):

$$T/R \text{ rate } (3) = \log 10(T3/100)/\log 10(R3/100) \quad (2\text{-}3)$$

wherein T3 represents an average transmittance at a wavelength of 1100 to 1200 nm through one face, and R3 represents a maximum reflectance at a wavelength of 1100 to 1200 nm at an incident angle of 60° on the other face, the laminated glass comprises a first glass plate, a second glass plate and an interlayer film arranged between the first glass plate and the second glass plate, the interlayer film comprises a first resin layer arranged on a vehicle exterior side, a second resin layer arranged on a vehicle interior side, and an infrared reflective layer provided between the first resin layer and the second resin layer, the first resin layer comprises a first infrared absorber having a maximum absorption wavelength peak ranging from 900 to 1300 nm, and the infrared reflective layer is a resin film with a metal foil.

11. A laminated glass having a T/R rate (4) of larger than 1, the T/R rate (4) being calculated from the following formula (2-4):

$$T/R \text{ rate } (4) = \log 10(T4/100)/\log 10(R4/100) \quad (2\text{-}4)$$

wherein T4 represents an average transmittance at a wavelength of 1200 to 1300 nm through one face, and R4 represents a maximum reflectance at a wavelength of 1200 to 1300 nm at an incident angle of 60° on the other face, the laminated glass comprises a first glass plate, a second glass plate and an interlayer film arranged between the first glass plate and the second glass plate, the interlayer film comprises a first resin layer arranged on a vehicle exterior side, a second resin layer arranged on a vehicle interior side, and an infrared reflective layer provided between the first resin layer and the second resin layer, the first resin layer comprises a first infrared absorber having a maximum absorption wavelength peak ranging from 900 to 1300 nm, and the infrared reflective layer is a resin film with a metal foil.

12. A laminated glass used in an infrared monitoring system, having a T/R rate (B) of larger than 1, the T/R rate (B) being calculated from the following formula (3):

$$T/R \text{ rate } (B) = \log 10(TB/100)/\log 10(RB/100) \quad (3)$$

wherein TB represents an average transmittance through one face at ±50 nm of a maximum emission wavelength of an infrared light source used in the infrared monitoring, and RB represents a maximum reflectance at ±50 nm of the maximum emission wavelength at an incident angle of 60° on the other face, the laminated glass comprises a first glass plate, a second glass plate and an interlayer film arranged between the first glass plate and the second glass plate, the interlayer film comprises a first resin layer arranged on a vehicle exterior side, a second resin layer arranged on a vehicle interior side, and an infrared reflective layer provided between the first resin layer and the second resin layer, the first resin layer comprises a first infrared absorber having a maximum absorption wavelength peak ranging from 900 to 1300 nm, and the infrared reflective layer is a resin film with a metal foil.

* * * * *